United States Patent
Bramble et al.

(10) Patent No.: US 10,896,399 B2
(45) Date of Patent: Jan. 19, 2021

(54) DYNAMIC CODE ASSIGNMENT FOR INTERNATIONAL SHIPMENT OF AN ITEM

(71) Applicant: United Parcel Service of America, Inc., Atlanta, GA (US)

(72) Inventors: Barry Alan Bramble, Alpharetta, GA (US); Christopher Bernard Maiocco, Atlanta, GA (US); Christopher Martin Rubio, Alpharetta, GA (US); Bruce Robert Petlock, Louisville, KY (US)

(73) Assignee: UNITED PARCEL SERVICE OF AMERICA, INC., Atlanta, GA (US)

( * ) Notice: Subject to any disclaimer, the term of this patent is extended or adjusted under 35 U.S.C. 154(b) by 631 days.

(21) Appl. No.: 15/231,974

(22) Filed: Aug. 9, 2016

(65) Prior Publication Data

US 2017/0046656 A1 Feb. 16, 2017

Related U.S. Application Data

(60) Provisional application No. 62/202,954, filed on Aug. 10, 2015.

(51) Int. Cl.
*G06Q 10/08* (2012.01)
*G06F 16/28* (2019.01)
(Continued)

(52) U.S. Cl.
CPC ....... *G06Q 10/0831* (2013.01); *G06F 16/285* (2019.01); *G06F 16/9535* (2019.01); *G06F 40/174* (2020.01); *G06Q 10/08* (2013.01)

(58) Field of Classification Search
CPC .. G06Q 10/0831; G06Q 10/08; G06F 17/243; G06F 17/30598; G06F 17/30867
See application file for complete search history.

(56) References Cited

U.S. PATENT DOCUMENTS 7,647,233 B2 1/2010 Kadaba et al.
7,725,406 B2 5/2010 Black et al.
(Continued)

FOREIGN PATENT DOCUMENTS

EP 2667336 A1 * 11/2013 ............. G06Q 10/08
EP 2667336 A1 11/2013
(Continued)

OTHER PUBLICATIONS

Patrick A. Messerlin, Trade Facilitation: Technical Regulations and Customs Procedures, 2000, p. 577-579 (Year: 2000).*
(Continued)

*Primary Examiner* — Kevin H Flynn
*Assistant Examiner* — Ibrahim N El-Bathy
(74) *Attorney, Agent, or Firm* — Shook, Hardy & Bacon LLP

(57) ABSTRACT

Methods, systems, apparatus, and computer program products are provided. In an example embodiment, a communication comprising form fields is received. A form field corresponding to first item information for a first item is identified. A textual item description for the first item is extracted from the form field. A code schedule is accessed and one or more codes are determined for the first item based on the textual item description and the code schedule. An item database is queried to identify second items that are relevant to the first item and a confidence level for each of the codes is determined based on the relevant second items. If a confidence level corresponding to one of the codes is greater than a configurable confidence level, a first code is selected from the codes. An item database is updated to reflect the first code being assigned to the first item.

25 Claims, 12 Drawing Sheets

(51) Int. Cl.
  *G06F 16/9535* (2019.01)
  *G06F 40/174* (2020.01)

(56) References Cited

U.S. PATENT DOCUMENTS

| | | | |
|---|---|---|---|
| 7,792,863 B2 | 9/2010 | Uy et al. | |
| 7,854,378 B1 | 12/2010 | Smith et al. | |
| 8,495,068 B1 | 7/2013 | Awalt et al. | |
| 8,751,419 B2 | 6/2014 | Shimogori | |
| 8,965,820 B2 | 2/2015 | Kapadia et al. | |
| 2002/0004753 A1* | 1/2002 | Perkowski | G06Q 30/02 705/26.62 |
| 2005/0021358 A1 | 1/2005 | Uy et al. | |
| 2006/0036504 A1 | 2/2006 | Allocca et al. | |
| 2007/0073591 A1* | 3/2007 | Perry | G06Q 30/02 705/26.64 |
| 2012/0124050 A1 | 5/2012 | Yang et al. | |
| 2012/0130927 A1* | 5/2012 | Shimogori | G06N 99/005 706/12 |
| 2012/0158743 A1* | 6/2012 | Gardner | G06F 16/48 707/748 |
| 2014/0122418 A1* | 5/2014 | Leto | G06F 17/30371 707/609 |
| 2014/0180706 A1* | 6/2014 | Hanley | G16H 50/30 705/2 |
| 2015/0058215 A1 | 2/2015 | Johnson | |
| 2015/0205777 A1* | 7/2015 | Campanelli | G06F 17/243 715/226 |
| 2016/0104108 A1* | 4/2016 | Speich | G06Q 10/08 705/7.31 |
| 2016/0189060 A1* | 6/2016 | Ngo | G06O 10/02 705/5 |

FOREIGN PATENT DOCUMENTS

| | | |
|---|---|---|
| WO | 1999/009470 A1 | 2/1999 |
| WO | 2000/049552 A2 | 8/2000 |
| WO | WO 2001/024096 A1 | 4/2001 |
| WO | WO 2012/068238 A2 | 5/2012 |
| WO | WO 2014/165035 A1 | 10/2014 |
| WO | WO 2015/005995 A2 | 1/2015 |

OTHER PUBLICATIONS (IPEA/408) Written opinion under Chapter II dated Jul. 20, 2017 for WO Application No. PCT/US16/046147.
IPEA/416—International Preliminary Report on Patentability Chapter II dated Nov. 9, 2017 for WO Application No. PCT/US16/046147.
International Searching Authority, International Search Report and Written Opinion for International Application No. PCT/US2016/046147, dated Nov. 3, 2016, 11 pages, European Patent Office, Netherlands.
*BIMCO Family of Sites.* Shipping KPIs, BIMCO, 2006, www.shipping-kpi.org. Accessed Jan. 11, 2017.
*Borderlinx Family of Sites.* Borderlinx Shop & Ship Worldwide, Borderlinx, 2017, www.borderlinx.com/BE/en. Accessed Jan. 11, 2017.
Li, Y., et al., "Inspection-oriented coding service based on machine learning and semantics mining", *Expert Systems with Applications 31*, 2006, pp. 835-848, No. 31, Elsevier Ltd., U.K.
*SAP Family of Sites.* Analytics / SAP Global Trade Services, SAP, 2016, www.sap.com/pc/analytics/governance-risk-compliance/software/global-trade-services/index.html. Accessed Jan. 11, 2017.

* cited by examiner

| | |
|---|---|
| DATA INSTANCE DATE: | JULY 20, 2016 |
| ITEM IDENTIFIER: | ABC123 |
| UPC: | N/A |
| ITEM DESCRIPTION: | 36 DIAMETER ROUND SOLID WOODEN DINING TABLE WITH CHERRY FINISH |
| ENTITY INFORMATION: | TABLES'R'US |
| ASSIGNED CODE: | 9403.40.9040 |
| CONFIDENCE LEVEL: | 98% |
| SUCCESS INDICATOR: | ITEM CLEARED ON BETTER THAN AVERAGE TIME FRAME |
| SALE PRICE: | $600 |

FIG. 5

CUSTOMS BENCHMARKING FOR XYZ CORP. FOR HTS CODE 2693

505 — OVERALL (CHOOSE PARTICULAR <u>COUNTRY</u> OR <u>PORT</u>)

AVERAGE TIME FOR CUSTOMS CLEARANCE

| | | |
|---|---|---|
| LAST 30 DAYS: | 1 DAY | BETTER THAN AVERAGE |
| LAST 3 MONTHS: | 2 DAYS | AVERAGE |
| LAST YEAR: | 6 DAYS | BELOW AVERAGE |

NUMBER OF CUSTOMS HOLDS

| | | |
|---|---|---|
| LAST 30 DAYS: | 1 | BETTER THAN AVERAGE |
| LAST 3 MONTHS: | 6 | AVERAGE |
| LAST YEAR: | 85 | BELOW AVERAGE |

510A — ( HOW TO IMPROVE )    510B — ( SELECT ANOTHER HTS CODE )

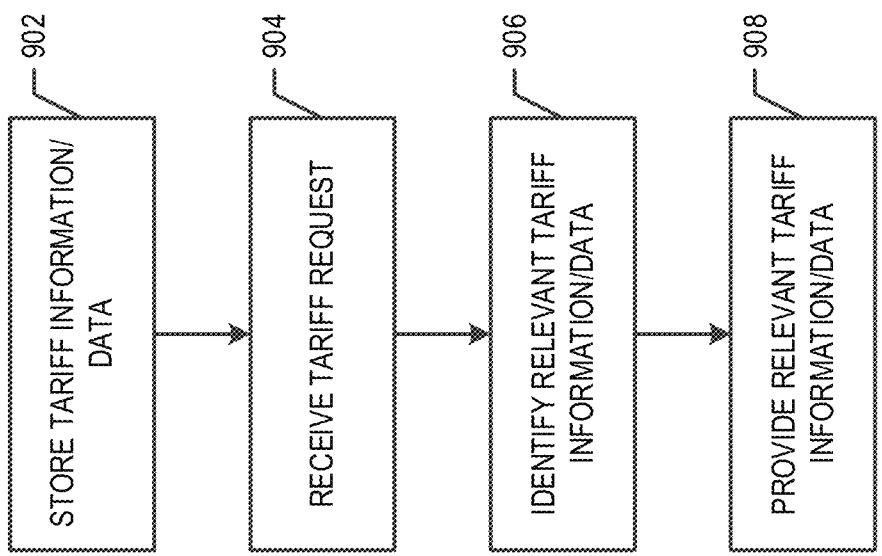

DYNAMIC CODE ASSIGNMENT FOR INTERNATIONAL SHIPMENT OF AN ITEM

CROSS-REFERENCE TO RELATED APPLICATIONS

This application claims priority to U.S. Provisional Application No. 62/202,954 filed Aug. 10, 2015, the contents of which are incorporated herein in their entirety by reference.

BACKGROUND

Importing and exporting items across international boundaries and borders is a complicated process involving many regulations that vary from country to country. For example, many countries restrict the type of items that can be imported/exported under the auspices of international trade agreements or unilateral regulation by the importing/exporting country. For instance, special permits may be required for importing particular items to specific consignees. Finally, each country may have different documentation requirements that must be met, and these are typically based on the type of item being imported/exported (e.g., machine products, textiles, agricultural goods). To facilitate processing, most countries have adopted an international items classification scheme for categorizing items. The scheme provides a classification number along with a description of the item. The importing country assigns a duty rate based on the classification of the items. Thus, the duty rate in conjunction with the value of the items (and other factors) allows calculation of the duties and taxes to be paid to customs for the imported/exported items.

Although a basic business function, determining the cost of importing items (i.e., costs other than the purchase prices of the items) is a complicated process. Obtaining an accurate cost of importing items has been, and still is, a difficult endeavor, frequently filled with estimates. Because ascertaining an accurate cost prior to shipping is so difficult, initial estimates are often used, and the final cost is "trued up" after the items are imported/exported and the actual cost of importation/exportation is determined afterwards.

The cost of importing/exporting items is often referred to as the "landed cost" of a shipment. This involves the total cost of delivering the goods from origination (consignor/shipper) to destination (consignee/recipient) and comprises transportation (shipping) costs and various duties and taxes. The transportation costs are associated with transferring, loading, and unloading the goods along the route (frequently involving costs associated with air or marine transportation, portage, short term storage, transfers, local shipping, and/or the like). The other major components of landed cost are the regulatory costs of duties and taxes that are dependent on the origin/destination country. These costs may include various value added taxes (VAT), import duties, custom (tariff) charges, and/or surcharges assessed based on the type and value of item. For example, a raw product and a processed product of the same basic material (e.g., spooled wool fiber versus woven wool fabric) are taxed and tariffed differently. Alternatively, a single consumer product, such as a wrist watch, may be tariffed and taxed as multiple commodity items, e.g., a watch band, watch works, and watch case. Further, taxes for a jeweled, gold-metal watch case may be less than taxes for a plain, steel-metal watch case.

It is readily evident that consistent assessment of tariffs and duties requires a well-defined international items classification scheme. That is the purpose of the Harmonized Tariff Schedule (HTS). Manufacturers, transporters, exporters, importers, customs officials, statisticians, and others use the system for classifying items for international trade under a single commodity code. The system contains approximately 5,000 headings and subheadings of goods, generally organized by industry segments. While the scheme is international in nature and authority, the treatment for items of a given classification is typically national and varies by each exporting/importing country. Some countries may define sublevels of classifications. Determining the duties and tariffs associated with a shipment of one or more items (a process called "rating" or "classification") requires knowledge of not only the exporting/importing country's regulatory requirements, but the rules of how that country applies the international classification system.

Once the shipment has been rated (and assuming none of the items are restricted from importation), the required duties and tariffs must be paid to the appropriate governmental agencies, typically the Customs Office. Information/data for each item being imported/exported must be detailed to the Customs Office in a document called a Declaration. The creation of the Declaration can be divided into two activities. In the first activity, the carrier typically communicates information/data regarding the shipment to a broker. The information/data includes descriptions of the items, values, quantities, consignor, consignee, and/or the like. In many instances, the carrier obtains this information/data from the consignor when the shipment originates. The second activity involves the broker classifying each of the items in the shipment that generates the amount due for the duties and taxes. Once completed, the Declaration can be communicated to the Customs Office by either party along with the amount due. Once the amount due is collected by the Customs Office and has reviewed the Declaration, the Customs Office issues a "customs clearance" to the carrier indicating that delivery to the consignee may proceed. Usually, if items have arrived at that importing/exporting port or terminal, the imported/exported items are temporarily stored until clearance is obtained, and then local delivery of the goods continues. To minimize storage costs and delays, it is desirable to provide accurate and complete information/data to the Customs Office to facilitate a timely clearance response for a shipment.

Rating is based on a "Declaration" indicating the items shipped. The Declaration includes, among other information, the quantity of items, their description, part number, and value. The items may be further decomposed into "commodities" correlating with internationally recognized commodities for customs processing and which are identified by tariff codes (e.g., HTS codes). For example, an imported/exported wristwatch may be listed as commodities comprising a watchband, case, and watch mechanism. The Declaration provided by the originator may detail the commodities and associated tariff codes, and if provided, this simplifies customs processing. Frequently, the item description provided by the shipper does not directly comport to an international commodity description, or if it does, no tariff codes are provided. This significantly complicates rating as the carrier or customs broker must determine the appropriate commodities and tariff codes for the identified items. Moreover, if improper tariff codes are provided, it may take significantly longer to achieve clearance. Incompletely or incorrectly prepared Declarations and/or ratings may lead to the items being held, audits being conducted, and/or the like, causing delays in the items being cleared.

Thus, there is a need for methods, systems, apparatus, and computer program products for improving the efficiency of correctly and completely preparing Declarations and rating items and/or shipments of items.

BRIEF SUMMARY

Embodiments of the present invention provide systems, methods, computer program products, and apparatuses for improving the efficiency of correctly and completely preparing documents and/or electronic submissions and the calculation of fees for importing and exporting items. Example embodiments are configured to dynamically classify items based on a code schedule. For example, based on item information/data corresponding to a first item, one or more possible codes may be identified for the first item. A confidence level for each code may be determined based on a machine learning algorithm, an item database comprising information/data regarding previously assigned codes, and/ or the like. If at least one of the codes is greater than a configurable confidence level, the code corresponding to the highest confidence level may be assigned to the first item. In example embodiments, the code may be a harmonized tariff code, other tariff code, and/or other code related to shipping an item, brokering an item through customs, importing/ exporting an item, and/or the like.

According to one aspect, a method is provided. In an example embodiment, the method comprises receiving, by one or more processors and through a communications interface, a communication comprising a plurality of form fields; identifying, by the one or more processors, at least one form field corresponding to first item information for a first item based at least in part on at least one of (a) metadata corresponding to the form field or (b) a translator key corresponding to the communication; extracting, by the one or more processors, at least a textual item description for the first item from the at least one form field. The method may further comprise accessing, by the one or more processors, a code schedule stored in a memory accessible to the one or more processors; and determining, by the one or more processors, one or more codes for the first item based on the textual item description and the code schedule. The method may further comprise querying, by the one or more processors, an item database stored in a memory accessible to the one or more processors to identify one or more second items that are relevant to the first time. The item database comprises at least (a) an item description, (b) an assigned code, and (c) a success indicator for the assigned code for each of a plurality of items and wherein the plurality of items comprises the one or more second items. The method may further comprise determining, by the one or more processors, a confidence level for each of the one or more codes based at least in part on (a) the textual item description for the first item and (b) the item description, assigned code, and a success indicator for the assigned code for the one or more second items. The method may further comprise determining, by the one or more processors, that at least one confidence level corresponding to the one or more codes is greater than a configurable confidence level; selecting, by the one or more processors, a first code from the one or more codes, wherein a first confidence level corresponding to the first code is larger than a second confidence level corresponding to a second code of the one or more codes; and updating, by the one or more processors, the item database to comprise at least a portion of the first item information and the first code.

According to another aspect, an apparatus is provided. In an example embodiment, the apparatus comprises at least one processor and at least one memory storing computer program code. The at least one memory and the computer program code configured to, with the processor, cause the apparatus to at least receive a communication comprising a plurality of form fields; identify at least one form field corresponding to first item information for a first item based at least in part on at least one of (a) metadata corresponding to the form field or (b) a translator key corresponding to the communication; and extract at least a textual item description for the first item from the at least one form field. The at least one memory and computer program code may be further configured to, with the processor, cause the apparatus to at least access a code schedule stored in a memory accessible to the one or more processors; and determine one or more codes for the first item based on the textual item description and the code schedule. The at least one memory and computer program code may be further configured to, with the processor, cause the apparatus to at least query an item database stored in a memory accessible to the one or more processors to identify one or more second items that are relevant to the first time. The item database comprises at least (a) an item description, (b) an assigned code, and (c) a success indicator for the assigned code for each of a plurality of items and wherein the plurality of items comprises the one or more second items. The at least one memory and computer program code may be further configured to, with the processor, cause the apparatus to at least determine a confidence level for each of the one or more codes based at least in part on (a) the textual item description for the first item and (b) the item description, assigned code, and a success indicator for the assigned code for the one or more second items. The at least one memory and computer program code may be further configured to, with the processor, cause the apparatus to at least determine that at least one confidence level corresponding to the one or more codes is greater than a configurable confidence level; select a first code from the one or more codes, wherein a first confidence level corresponding to the first code is larger than a second confidence level corresponding to a second code of the one or more codes; and update the item database to comprise at least a portion of the first item information and the first code.

According to yet another aspect, a computer program product is provided. In an example embodiment, the computer program product comprises at least one non-transitory computer-readable storage medium having computer-executable program code instructions stored therein. The computer-executable program code instructions comprising program code instructions configured to receive a communication comprising a plurality of form fields; identify at least one form field corresponding to first item information for a first item based at least in part on at least one of (a) metadata corresponding to the form field or (b) a translator key corresponding to the communication; and extract at least a textual item description for the first item from the at least one form field. The computer-executable program code instructions may further comprise program code instructions configured to access a code schedule stored in a memory accessible to the one or more processors; and determine one or more codes for the first item based on the textual item description and the code schedule. The computer-executable program code instructions may further comprise program code instructions configured to query an item database stored in a memory accessible to the one or more processors to identify one or more second items that are relevant to the first time. The item database comprises at least (a) an item description, (b) an assigned code, and (c) a success indicator for the assigned code for each of a plurality of items and wherein the plurality of items comprises the one or more second items. The computer-executable program code instructions may further comprise program code instructions configured to determine a confidence level for each of the one or more codes based at least in part on (a) the textual item description for the first item and (b) the item description, assigned code, and a success indicator for the assigned code for the one or more second items. The computer-executable program code instructions may further comprise program code instructions configured to determine that at least one confidence level corresponding to the one or more codes is greater than a configurable confidence level; select a first code from the one or more codes, wherein a first confidence level corresponding to the first code is larger than a second confidence level corresponding to a second code of the one or more codes; and update the item database to comprise at least a portion of the first item information and the first code.

BRIEF DESCRIPTION OF THE SEVERAL VIEWS OF THE DRAWING(S)

The accompanying drawings incorporated herein and forming a part of the disclosure illustrate several aspects of the present invention and together with the detailed description serve to explain certain principles of the present invention. In the drawings, which are not necessarily drawn to scale:

Figure 1:
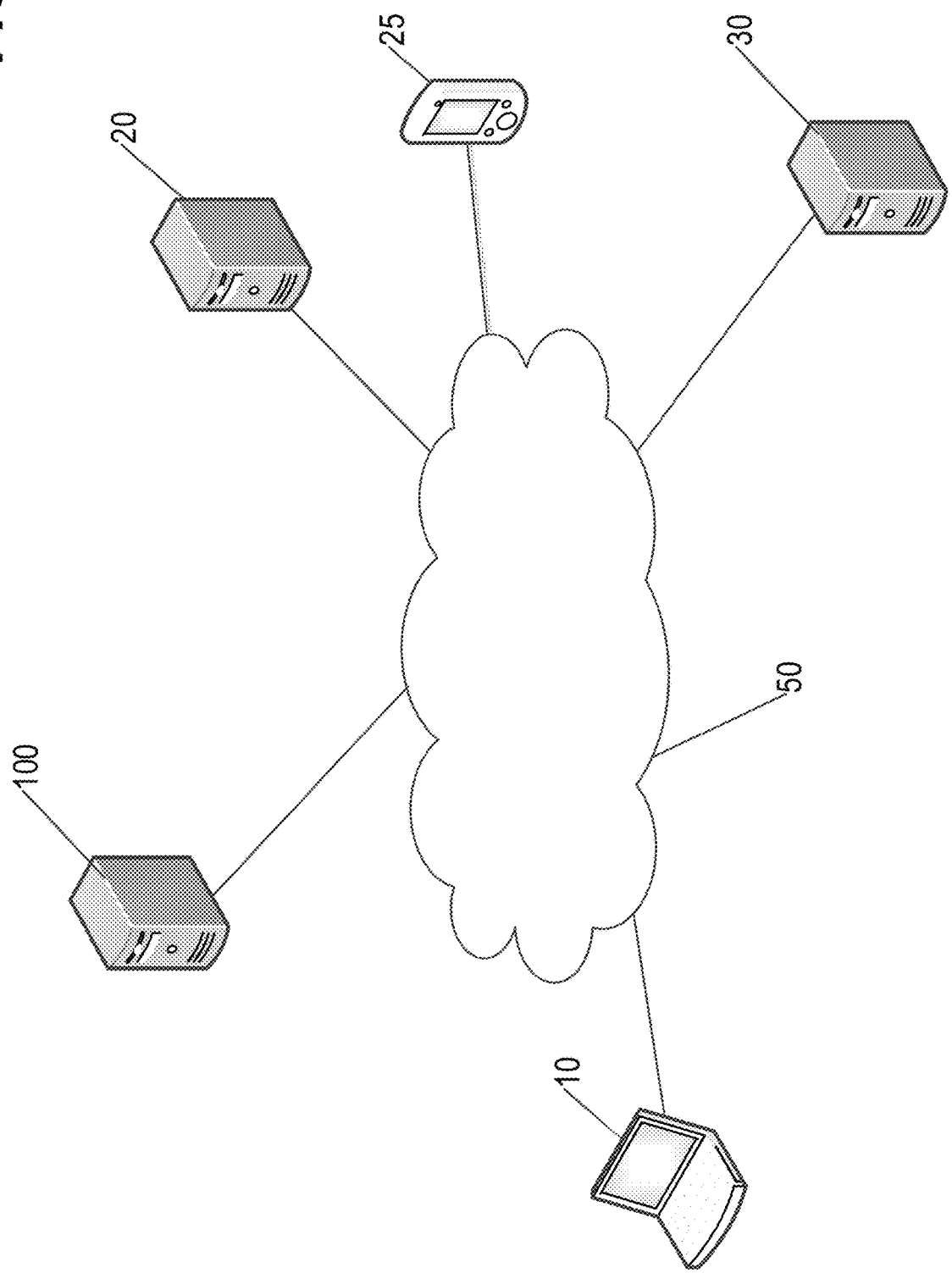
FIG. 1 is a block diagram of a system architecture that may be used in conjunction with various embodiments of the present invention.

FIGS. 3, 4, 8, 9, and 11 each provide a flowchart illustrating various processes and procedures that may be completed in accordance with various embodiments of the present invention;

FIG. 5 illustrates an example item record in the item database, in accordance with example embodiments of the present invention; and FIGS. 6, 7, 10 and 12 illustrate example views of a user interface, in accordance with an embodiment of the present invention.

DETAILED DESCRIPTION

Various embodiments of the present invention now will be described more fully hereinafter with reference to the accompanying drawings, in which some, but not all embodiments of the invention are shown. Indeed, this invention may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout.

I. COMPUTER PROGRAM PRODUCTS, METHODS, AND COMPUTING ENTITIES

Embodiments of the present invention may be implemented in various ways, including as computer program products. A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory, multimedia memory cards (MMC), secure digital (SD) memory cards, Memory Sticks, and/or the like. Further, a non-volatile computer-readable storage medium may also include conductive-bridging random access memory (CBRAM), phase-change random access memory (PRAM), ferroelectric random-access memory (FeRAM), resistive random-access memory (RRAM), Silicon-Oxide-Nitride-Oxide-Silicon memory (SONOS), racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Rambus in-line memory module (RIMM), dual in-line memory module (DIMM), single in-line memory module (SIMM), video random access memory (VRAM), cache memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like. As such, embodiments of the present invention may take the form of an apparatus, system, computing device, computing entity, and/or the like executing instructions stored on a computer-readable storage medium to perform certain steps or operations. However, embodiments of the present invention may also take the form of an entirely hardware embodiment performing certain steps or operations.

Embodiments of the present invention are described below with reference to block diagrams and flowchart illustrations. Thus, it should be understood that each block of the block diagrams and flowchart illustrations, respectively, may be implemented in the form of a computer program product, an entirely hardware embodiment, a combination of hardware and computer program products, and/or apparatus, systems, computing devices, computing entities, and/or the like carrying out instructions on a computer-readable storage medium for execution. Such embodiments can produce specifically-configured machines performing the steps or operations specified in the block diagrams and flowchart illustrations. Accordingly, the block diagrams and flowchart illustrations support various combinations of embodiments for performing the specified steps or operations.

II. GENERAL OVERVIEW

Embodiments of the present invention are directed to improving the efficiency of correctly and completely preparing documents and/or electronic submissions (e.g., Declarations and/or the like) and the calculation of fees (e.g., duty, taxes, and/or the like) for importing and exporting items. For example, various embodiments of the present invention provide systems, methods, computer program products, apparatuses and/or the like for dynamically classifying item(s) (e.g., assigning one or more tariff codes to an item), digitally and/or electronically capturing order information, customs benchmarking (e.g., providing analysis of a customer's customs performance and a comparison of a customer's customs performance compared to the customs performance of other customers shipping similar items, and/or the like), providing a common customs rules repository, and/or the like. Customs performance, brokerage performance, or other terms used interchangeably herein, may be a measure of and/or indicate the length of time needed for customs clearance of items being imported, the number of holds experienced by items shipped and/or received by the customer, the number and/or results of customs audits conducted affecting the customer, and/or the like and may be expressed in relation to the customer's customs goals, the customer's peers customs performance, and/or the like.

III. SYSTEM ARCHITECTURE

FIG. 1 illustrates an example embodiment of a system architecture that may be used in conjunction with various embodiments of the present invention. The embodiment illustrated in FIG. 1 includes one or more carrier systems 100, one or more carrier computing devices 10, one or more customer systems 20, one or more customer computing devices 25, one or more customs systems 30, and one or more networks 50. Each of these components may be in direct or indirect communication with, for example, one another over the same or different wired or wireless networks 50. Additionally, although the system entities can be separate, standalone entities, the various embodiments are not limited to this particular architecture.

1. Carrier System

The carrier system 100 may be operated by and/or on behalf of a carrier that may transport, pick up, deliver, and/or the like of one or more items and/or participate in the brokerage of one or more items through customs. An item may be any tangible and/or physical object (e.g., a good, commodity, product, or other physical object). In one embodiment, an item may be or be enclosed in one or more packages, parcels, bags, containers, loads, crates, items banded together, vehicle parts, pallets, drums, the like, and/or similar words used herein interchangeably. Such items may include the ability to communicate (e.g., via a chip (e.g., an integrated circuit chip), RFID, NFC, Bluetooth, Wi-Fi, and any other suitable communication techniques, standards, or protocols) with one another and/or communicate with various computing entities for a variety of purposes. In this regard, in some example embodiments, an item may communicate send "to" address information/data, received "from" address information/data, unique identifier codes, and/or various other information/data. In one embodiment, each item may include an item/shipment shipping identifier, such as an alphanumeric identifier. Such item/shipment shipping identifiers may be represented as text, barcodes, tags, character strings, Aztec Codes, Maxi-Codes, Data Matrices, Quick Response (QR) Codes, electronic representations, and/or the like. A unique item/shipment shipping identifier (e.g., 123456789) may be used by the carrier to identify and track the item as it moves through the carrier's transportation network. Further, such item/shipment shipping identifiers can be affixed to items by, for example, using a sticker (e.g., label) with the unique item/shipment shipping identifier printed thereon (in human and/or machine readable form) or an RFID tag with the unique item/shipment shipping identifier stored therein.

Figure 2:
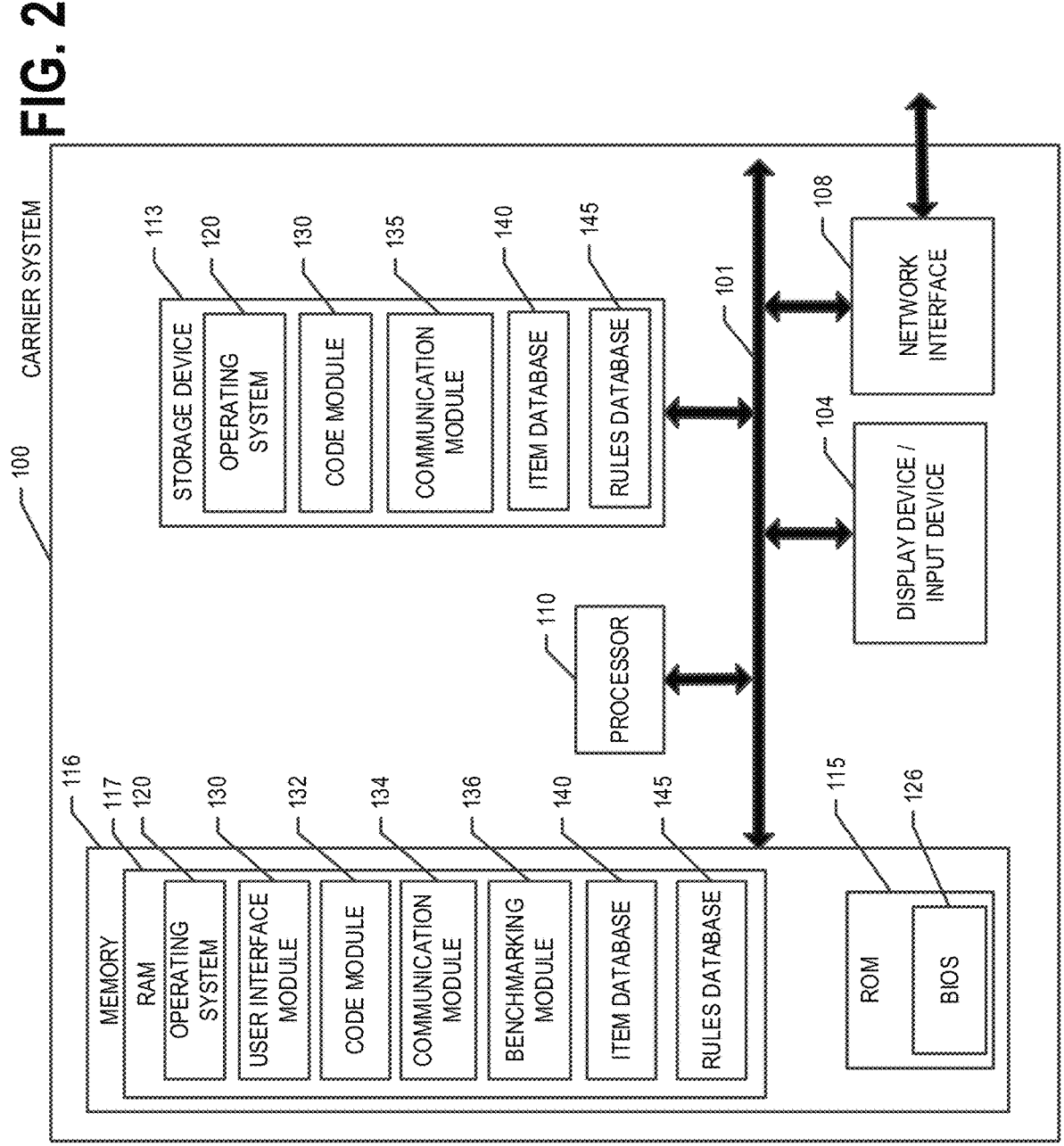
FIG. 2 is a schematic block diagram of a carrier system according to various embodiments of the present invention.

FIG. 2 shows a schematic diagram of an example carrier system 100. In general, the term system may refer to, for example, one or more computers, computing entities, desktop computers, mobile phones, tablets, phablets, notebooks, laptops, distributed systems, gaming consoles (e.g., Xbox, Play Station, Wii), watches, glasses, iBeacons, proximity beacons, key fobs, RFID tags, ear pieces, scanners, televisions, dongles, cameras, wristbands, wearable items/devices, items/devices, vehicles, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As indicated, in one embodiment, the carrier system 100 may also include one or more communications interfaces for communicating with various computing entities, such as by communicating data, content, information, and/or similar terms used herein interchangeably that can be transmitted, received, operated on, processed, displayed, stored, and/or the like. For instance, the carrier system 100 may communicate with one or more carrier computing devices 10, one or more customer systems 20, one or more customer computing devices 25, one or more customs systems 30, and/or the like.

In one embodiment, the carrier system 100 may include or be in communication with one or more processing elements 110 (also referred to as processors, processing circuitry, and/or similar terms used herein interchangeably) that communicate with other elements within the carrier system 100 via a bus 101, for example. As will be understood, the processing element 110 may be embodied in a number of different ways. For example, the processing element may be embodied as one or more complex programmable logic devices (CPLDs), microprocessors, multi-core processors, coprocessing entities, application-specific instruction-set processors (ASIPs), and/or controllers. Further, the processing element 110 may be embodied as one or more other processing devices or circuitry. The term circuitry may refer to an entirely hardware embodiment or a combination of hardware and computer program products. Thus, the processing element 110 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 110 may be configured for a particular use or configured to execute instructions stored in volatile or non-volatile media or otherwise accessible to the processing element. As such, whether configured by hardware or computer program products, or by a combination thereof, the processing element 110 may be capable of performing steps or operations according to embodiments of the present invention when configured accordingly.

In one embodiment, the carrier system 100 may further include memory or be in communication with memory 116, which may comprise non-volatile media (also referred to as non-volatile storage, memory, memory storage, memory circuitry and/or similar terms used herein interchangeably). In one embodiment, the non-volatile storage or memory 116 may include one or more non-volatile storage or memory media as described above, such as hard disks, ROM, PROM, EPROM, EEPROM, flash memory, MMCs, SD memory cards, Memory Sticks, CBRAM, PRAM, FeRAM, RRAM, SONOS, racetrack memory, and/or the like. As will be recognized, the non-volatile storage or memory media may store databases, database instances, database management systems, data, applications, programs, program modules, scripts, source code, object code, byte code, compiled code, interpreted code, machine code, executable instructions, and/or the like. For example, the non-volatile storage or memory may store code such as the user interface module 130, code module 132, communication module 134, and/or benchmarking module 136. The non-volatile storage or memory may store an item database 140 and/or a rules database 145. The term database, database instance, database management system, and/or similar terms used herein interchangeably may refer to a structured collection of records or information/data that is stored in a computer-readable storage medium, such as via a relational database, hierarchical database, and/or network database.

In one embodiment, the memory 116 may further comprise volatile media (also referred to as volatile storage, memory, memory storage, memory circuitry and/or similar terms used herein interchangeably). In one embodiment, the volatile storage or memory may also include one or more volatile storage or memory media as described above, such as RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element. Thus, the databases, database instances, database management systems, data, applications, programs, program modules, scripts, source code, object code, byte code, compiled code, interpreted code, machine code, executable instructions, and/or the like may be used to control certain aspects of the operation of the carrier system 100 with the assistance of the processing element 110 and operating system 120.

In various embodiments, memory 116 can be considered primary memory such as RAM memory or other forms which retain the contents only during operation, or it may be a non-volatile memory, such as ROM, EPROM, EEPROM, FLASH, or other types of memory that retain the memory contents. In some embodiments, the disk storage may communicate with the processor 110 using an I/O bus instead of a dedicated bus. The memory 116 could also be secondary memory, such as disk storage, that stores a relatively large amount of information/data. The secondary memory may be a floppy disk, hard disk, compact disk, DVD, or any other type of mass storage type known to those skilled in the computer arts. The memory 116 may also comprise any application program interface, system, libraries and any other information/data by the processor to carry out its functions. ROM 115 is used to store a basic input/output system 126 (BIOS), containing the basic routines that help to transfer information/data between components of the carrier system 100, including the user interface module 130, code module 132, communication module 134, and/or benchmarking module 136, item database 140, rules database 145, and/or the operating system 120.

In addition, the carrier system 100 includes at least one storage device 113, such as a hard disk drive, a floppy disk drive, a CD-ROM drive, or optical disk drive, for storing information/data on various computer-readable media, such as a hard disk, a removable magnetic disk, or a CD-ROM disk. As will be appreciated by one of ordinary skill in the art, each of these storage devices 113 is connected to the system bus 101 by an appropriate interface. It is important to note that the computer-readable media described above could be replaced by any other type of computer-readable media known in the art. Such media include, for example, memory sticks (e.g., USB memories), magnetic cassettes, flash memory cards, digital video disks, and Bernoulli cartridges.

A number of program modules may be stored by the various storage devices and within RAM 117. Such program modules include the operating system 120, user interface module 130, code module 132, communication module 134, and/or benchmarking module 136. Those skilled in the art will appreciate that other modules may be present in RAM 117 to effectuate the various embodiments of the present invention. Furthermore, rather than program modules, the user interface module 130, code module 132, communication module 134, and/or benchmarking module 136 may comprise stand-alone computers connectively coupled to the carrier system 100.

Also located within the carrier system 100 is a network interface 108, for interfacing and communicating with other elements of a computer network, such as by communicating data, content, information, and/or similar terms used herein interchangeably that can be transmitted, received, operated on, processed, displayed, stored, and/or the like. For instance, the carrier system 100 may be in communication with one or more customer computing entities 20. Such communication may be executed using a wired data transmission protocol, such as fiber distributed data interface (FDDI), digital subscriber line (DSL), Ethernet, asynchronous transfer mode (ATM), frame relay, data over cable service interface specification (DOC SIS), or any other wired transmission protocol. Similarly, the route planning server 200 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1x(1xRTT), Wideband Code Division Multiple Access (WCDMA), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), 802.16 (WiMAX), ultra wideband (UWB), infrared (IR) protocols, Bluetooth protocols, wireless universal serial bus (USB) protocols, and/or any other wireless protocol.

Various data, information, and other similar words used herein interchangeably is input by a user to the carrier system 100 via the network interface 108 and/or input/output device 104. This input information/data may include information/data related to one or more items to be shipped/imported/exported/delivered, a code schedule (e.g., HTS codes, program codes, and/or the like), customer invoices, and/or the like. This input information/data may vary, however, depending on the configuration and informational requirements of the carrier system 100.

As mentioned above, the carrier system 100 also includes an input/output device 104 for receiving and displaying information/data. The carrier system 100 may include or be in communication with one or more input elements, such as a keyboard input, a mouse input, a touch screen/display input, audio input, pointing device input, joystick input, keypad input, and/or the like, as indicated by input/output device 104. The carrier system 100 may also include or be in communication with one or more output elements, as indicated by input/output device 104, such as audio output, video output, screen/display output, motion output, movement output, and/or the like.

The carrier system 100 is configured to facilitate shipping, importing, and/or exporting one or more items for one or more customers. The carrier system 100 may be further configured to assign a code (e.g., a tariff code, an HTS code, and/or the like) to an item, provide information/data about rules related to shipping/exporting/importing/delivering various items, electronically and/or digitally capturing information from a communication (e.g., a portable document format (pdf) file or file in another format comprising a customer invoice, and/or the like), provide a customer with feedback regarding the customer's customs performance, and/or the like. The carrier system 100 may be configured to be in communication with one or more carrier computing devices 10, one or more customer systems 20, one or more customer computing devices 25, one or more customs systems 30, and/or the like.

The carrier system 100 may also comprise various other systems, such as an Address Matching System (AMS), an Internet Membership System (IMS), a Customer Profile System (CPS), a Package Center information/data System (PCIS), a Customized Pickup and Delivery System (CPAD), a Web Content Management System (WCMS), a Notification Email System (NES), a Fraud Prevention System (FPS), and a variety of other systems corresponding to the pick-up, transportation, delivery, brokerage, and/or the like of items and related activities and their corresponding components.

Those skilled in the art will recognize that many other alternatives and architectures are possible and can be used to practice various embodiments of the invention. The embodiment illustrated in FIG. 2 can be modified in different ways or incorporated within a network and be within the scope of the invention. For example, one or more components of the carrier system 100 may be located remotely from other carrier system 100 components, such as in a distributed system. Furthermore, one or more of the components may be combined and additional components performing functions described herein may be included in the carrier system 100. Thus, the carrier system 100 can be adapted to accommodate a variety of needs and circumstances.

2. Carrier Computing Device

A carrier computing device 10 may be operated by an employee of the carrier. The carrier computing device 10 may include one or more components that are functionally similar to those of the carrier system 100. For example, in one embodiment, each carrier computing device 10 may include one or more processing elements, one or more display device/input devices, volatile and non-volatile storage or memory, and/or one or more communications interfaces. In various embodiments, a carrier computing device 10 may be in communication with the carrier system 100 via a proprietary wired or wireless network. In various embodiments, the carrier computing device 10 may be a client of the carrier system 100. These architectures are provided for exemplary purposes only and are not limiting to the various embodiments. Further, the term computing device may refer to one or more computers, computing entities, desktop computers, mobile phones, tablets, phablets, notebooks, laptops, distributed systems, gaming consoles (e.g., Xbox, Play Station, Wii), watches, glasses, iBeacons, proximity beacons, key fobs, RFID tags, ear pieces, scanners, televisions, dongles, cameras, wristbands, wearable items/devices, items/devices, vehicles, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein.

3. Customer System

A customer (e.g., consignor, consignee, shipper, or receiver) may be an individual, a family, a company, an organization, an entity, a department within an organization, a representative of an organization and/or person, and/or the like. For example, a customer may ship or receive one or more items across international borders. A customer system 20 may be operated by and/or on behalf of a customer. In example embodiments, a customer may be associated with one or more industries (e.g., a customer that manufactures and/or ships tables may be associated with the industry of furniture). The customer system 20 may include one or more components that are functionally similar to those of the carrier system 100. For example, in one embodiment, each customer system 20 may include one or more processing elements, one or more display device/input devices, volatile and non-volatile storage or memory, and/or one or more communications interfaces. In various embodiments, a customer system 20 may store one or more item databases, one or more order databases, and/or the like. These architectures are provided for exemplary purposes only and are not limiting to the various embodiments. Further, the term computing device may refer to one or more computers, computing entities, desktop computers, mobile phones, tablets, phablets, notebooks, laptops, distributed systems, gaming consoles (e.g., Xbox, Play Station, Wii), watches, glasses, iBeacons, proximity beacons, key fobs, RFID tags, ear pieces, scanners, televisions, dongles, cameras, wristbands, wearable items/devices, items/devices, vehicles, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein.

4. Customer Computing Device

A customer computing device 25 may be operated by an employee or affiliate of the customer, or other individual associated with the customer (referred to as a customer affiliate herein). The customer computing device 25 may include one or more components that are functionally similar to those of the carrier system 100. For example, in one embodiment, each customer computing device 25 may include one or more processing elements, one or more display device/input devices, volatile and non-volatile storage or memory, and/or one or more communications interfaces. In various embodiments, a customer computing device 25 may be in communication with the customer system 20 via a proprietary wired or wireless network. In various embodiments, the customer computing device 25 may be a client of the customer system 20. These architectures are provided for exemplary purposes only and are not limiting to the various embodiments. Further, the term computing device may refer to one or more computers, computing entities, desktop computers, mobile phones, tablets, phablets, notebooks, laptops, distributed systems, gaming consoles (e.g., Xbox, Play Station, Wii), watches, glasses, iBeacons, proximity beacons, key fobs, RFID tags, ear pieces, scanners, televisions, dongles, cameras, wristbands, wearable items/devices, items/devices, vehicles, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein.

5. Customs System

A customs agency may be an organization that oversees the importation and/or exportation of goods from a country, port, and/or the like. For example, a customs agency may be a government organization responsible for overseeing and collecting taxes and fees for the importation and exportation of goods from a country. A customs system 30 may be operated by and/or on behalf of a customs agency. For example, a customs system 30 may be operated by a customs agent. For example, a customs agent associated with a customs agency may review Declarations, clear items, place items on hold, conduct audits, and/or the like. The customs system 30 may include one or more components that are functionally similar to those of the carrier system 100. For example, in one embodiment, each customs system 30 may include one or more processing elements, one or more display device/input devices, volatile and non-volatile storage or memory, and/or one or more communications interfaces. In various embodiments, a customs system 30 may be configured to receive information/data from a carrier system 100 and/or a customer system 20 pertaining to one or more items being imported/exported to or exported from the country and/or port associated with the customs agency. In various embodiments, the customs system 30 may be configured to communicate a customs status (e.g., clearance, hold, audit, and/or the like) pertaining to one or more items to a carrier system 100 and/or a customer system 20. These architectures are provided for exemplary purposes only and are not limiting to the various embodiments. Further, the term computing device may refer to one or more computers, computing entities, desktop computers, mobile phones, tablets, phablets, notebooks, laptops, distributed systems, gaming consoles (e.g., Xbox, Play Station, Wii), watches, glasses, iBeacons, proximity beacons, key fobs, RFID tags, ear pieces, scanners, televisions, dongles, cameras, wristbands, wearable items/devices, items/devices, vehicles, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein.

IV. SYSTEM OPERATION

As previously noted, example embodiments of the present invention are configured to assign a code to an item. For example, a tariff code (e.g., HTS code) may be assigned to an item before the item is shipped (e.g., before the item is tendered to a carrier for shipment). In particular, example embodiments improve the efficiency of correctly and completely preparing documents and/or electronic submissions (e.g., Declarations and/or the like) and the calculation of fees for importing and exporting items (e.g., duty fees, taxes, and/or the like). For example, various embodiments of the present invention may dynamically assign one or more codes to an item, digitally and/or electronically capture information/data corresponding to the item from a communication (e.g., a pdf or other format of an invoice for an order including the item), provide analysis of a customer's customs performance and a comparison of a customer's customs performance compared to the customs performance of other customers shipping similar items, store and provide customs rules and regulations information/data for various countries and/or ports and/or the like. In particular, the present invention facilitates the clearing of customs as efficiently as possible by providing the carrier (e.g., the carrier system 100) with accurate information/data corresponding to item(s) (e.g., item description, code (e.g., tariff code, HTS code), monetary value, and/or the like) that may be shipped across country/regional boundaries, the information/data regarding shipment of the item(s) (e.g., country of origin, destination country, and/or the like), relevant customs information/data (e.g., laws, rules, and regulations; license requirements; relevant quota information/data; tax, duty, and/or other fee information, and/or the like), and/or the like before the customs clearance process for the order begins. This allows the carrier system 100 and/or a carrier employee (e.g., operating a carrier computing device 10) to prepare the appropriate customs clearance forms efficiently and accurately.

Various aspects of the present invention will now be described in more detail.

1. Item Information/Data Collection Application

In example embodiments, the item information/data collection application may be configured to crawl, systematically browse, search, query, and/or the like the customer system 20 (e.g., the item inventory), and/or an online and/or Internet accessible catalog provided, maintained, updated, and/or the like by the customer system 20 and/or customer computing device 25 and providing information/data about one or more items manufactured, sold, purchased, and/or shipped by the customer. In example embodiments, an item information/data collection application may operate on the carrier system 100 and/or one or more customer system 20. For example, the item information/data collection application may operate on the carrier system 100 and periodically and/or regularly request item information/data from the item inventory from the customer system 20 and/or crawl, systemically browse, search, query and/or the like the online and/or Internet accessible catalog associated with the customer. In another example, the item information/data collection application may operate on the customer system 20 and crawl, systematically browse, search, query, and/or the like the item inventory. In example embodiments, the item information/data collection application may identify records in the item inventory (and/or the catalog) that have been created and/or updated since the last time the item information/data collection application crawled, systematically browsed, searched, queried, and/or the like the item inventory (and/or the catalog). The new and/or updated item information may be provided to the carrier system and used to build, generate, and/or update the item database 140.

Figure 3:
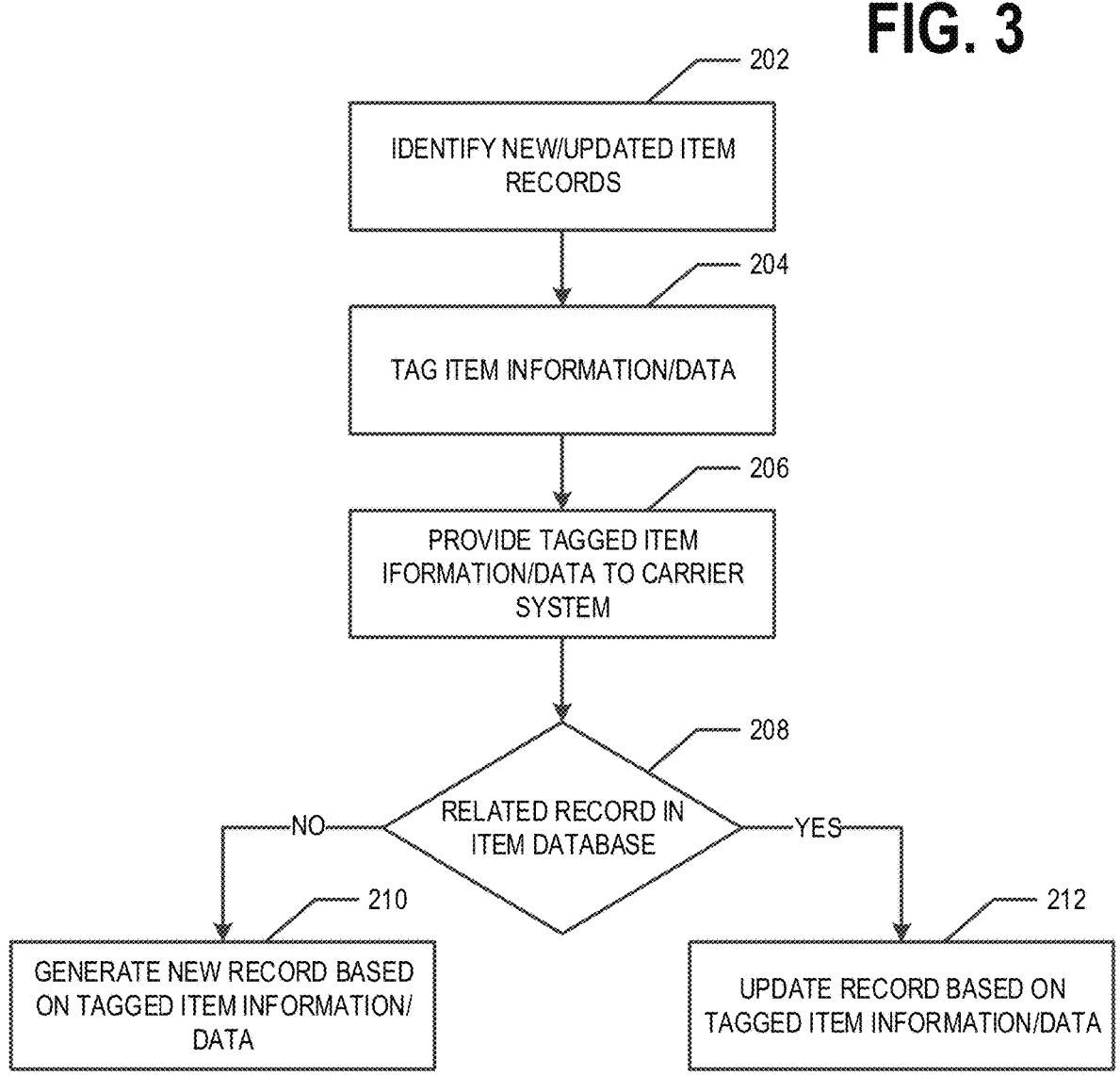

FIG. 3 provides a flowchart illustrating various processes and operations the item information/data collection application may perform to build, generate, and/or update an item database 140. Starting at block 202, one or more new and/or updated records are identified. For example, the item information/data collection application may be configured to crawl, systematically browse, search, query, and/or the like an item inventory stored by the consumer system 20 and/or a catalog associated with the consumer system 20 to identify records in the item inventory and/or the catalog that have been created and/or updated since the last time that the item information/data collection application crawled, systematically browsed, searched, queried, and/or the like the item inventory and/or the catalog. For example, new and/or updated records may be identified based on a timestamp stored therewith (e.g., as part of metadata associated with the record) indicating when the record was created and/or last updated.

At block 204, the item information/data collection application may identify, tag, and/or the like at least a portion of the item information/data in at least one of the one or more identified new and/or updated records. For example, the item information/data collection application may identify, tag, and/or the like an item identifier, item name, item description, Universal Product Code (UPC), and/or the like in a new and/or updated record. For example, various information/data of a new and/or updated record may be tagged such that the information/data may be easily compared with and/or integrated into the information/data stored in the item database 140. At block 206, the new or updated record(s) (and/or at least a portion of the information/data stored therein) may then be provided to the carrier system 100. For example, the item information/data collection application may be configured to provide at least a portion of the identified and/or tagged information/data may then be provided to the carrier system 100. In various embodiments, the order of the processes and procedures performed at block 204 and block 206 may be switched (e.g., the information/data of a new and/or updated record may be provided to the carrier system 100 and then the item/data may be tagged).

In example embodiments, the item database 140 may be updated based the identified and/or tagged information/data provided to the carrier system 100 through the item information/data collection application. In example embodiments, at block 208, it may be determined if a new and/or updated record corresponds to item information/data stored in the item database 140. For example, the item database 140 may be queried to determine if a new and/or updated record corresponds to item information/data stored in the item database 140. For example, the item database 140 may comprise item information/data that is identified based on an item identifier and/or the like. Thus, it may be determined (e.g., by processor 110) if the new and/or updated record corresponds to item information/data stored in the item database 140 based on matching the item identifier associated with the new and/or updated record and item information/data stored in the item database. In example embodiments, the item identifier stored in the item database 140 may comprise entity information/data. In example embodiments, entity information comprises an entity identifier configured to uniquely identify the customer associated with the item identified by the item identifier. In example embodiments, an entity associated with an item is a manufacturer, seller, purchaser, and/or shipper of an item. For example, if Tables'R'Us has an item identified by item identifier ABC123 in the customer system 20, carrier system 100 may store the item information/data corresponding to the item in association with the item identifier TRU-ABC123. In other words, in some embodiments, the item database 140 may store item information/data in association with an item identifier that has been amended (concatenated with) an entity identifier. In example embodiments, the item information/data stored in the item database 140 for the item may further comprise an entity information in addition to an item identifier (e.g., the database record for the item may include the entity information but may or may not concatenate the entity identifier with the item identifier). In such embodiments, the item database 140 may be queried based on the item identifier and the entity information. In some embodiments, the item database 140 may be queried by various combinations of item identifier, customer identifier, UPC, item description, item name, and/or other item information/data to determine if item information/data stored in the item database 140 corresponds to a new and/or updated record for which information/data has been received by the carrier system 100. If it is determined that the new and/or updated record does not correspond to item information/data already stored in the item database 140, a new database entry may be created and the item information/data of the entry may be populated based on the information/data of the new and/or updated record, at block 210. If it is determined that the new and/or updated record does correspond to item information/data already stored in the item database 140, the item information/data stored in the item database 140 may be compared to the information/data of the new and/or updated record to determine if the new and/or updated record comprises any new and/or updated information/data. At block 212, the item database 140 may then be updated to reflect, incorporate, indicate, and/or the like any new and/or updated information/data.

In example embodiments, the item information/data collection application may build, update, access, write to, and/or perform other operations with regard to the item database 140. For example, the item information/data collection application may access a customer item inventory (and/or catalog) and provide new and/or updated item information/data to the carrier system 100 that may be used to build and/or update the item database 140. For example, the item information/data collection application may build and/or update the item database 140 based on crawling, systemically browsing, searching, querying, and/or the like the item inventory (and/or catalog) associated with (e.g., stored by, provided by, updated by, and/or the like) the customer system 20. The item database 140 may comprise item information/data corresponding to items provided, manufactured, sold, purchased, shipped, and/or the like by a plurality of customers (e.g., received, accessed, and/or the like from a plurality of customer systems 20). The carrier system 100 may further populate the item database 140 with codes (e.g., tariff codes, HTS code, and/or the like) for one or more items, a success indicator for a code for an item, and/or the like. In example embodiments, the success indicator is configured to indicate the level of success at having the item be efficiently processed through customs when the code was used to classify the item. In example embodiments, the success indicator for a code may indicate the export and/or import country/port for which the code was used during customs processing. Thus, item information/data stored in the item database 140 for a plurality of customers may be used to dynamically classify an item.

1. Dynamic Item Classification

In various embodiments, the carrier system 100 may be configured to dynamically classify one or more items. For example, the carrier system 100 may provide an application (e.g., code module 132) that operates on the carrier system and/or on the customer system 20 to assign a code to an item before the item is shipped (e.g., before the item is tendered to a carrier for shipment). The application may be configured to identify one or more items (e.g., new/updated items, items identified in by a communication comprising an invoice/order, items in a catalog corresponding to the customer, and/or the like. In example embodiments, the item may be identified by a part number, a product identifier, a universal product code (UPC), and/or the like. The application may be further configured to identify information/data associated with the item (e.g., item description, item specifications, monetary value, and/or the like), and identify one or more possible codes that may be the correct code for the item. For example, the code may be a tariff code, HTS code, and/or the like. The one or more possible codes may be identified based on the item description, item specification, and/or the information/data associated with and/or corresponding to the item. For example, the carrier system 100 (e.g., the code module 132) learns from available item information/data corresponding to the same customer or from other similar customers to select one or more possible codes and determine a level of confidence for each of the one or more possible codes. For example, a level of confidence for each of the codes may be determined, allowing a code to be selected from the one or more possible codes. In particular, the code having the highest level of confidence associated therewith may be selected and assigned to the item. In example embodiments, it may be determined that at least one of the levels of confidence for the one or more possible codes is greater than a predetermined level of confidence threshold. In example embodiments, the level of confidence for each of the one or more possible codes is determined based on feedback received from previously assigned codes for one or more other items. For example, information/data regarding items, item information/data, and assigned codes may be stored in an item database 140. A machine learning algorithm may learn from the information/data instances stored in the item database 140 and, based thereon, compute the level of confidence for a code.

Figure 4:
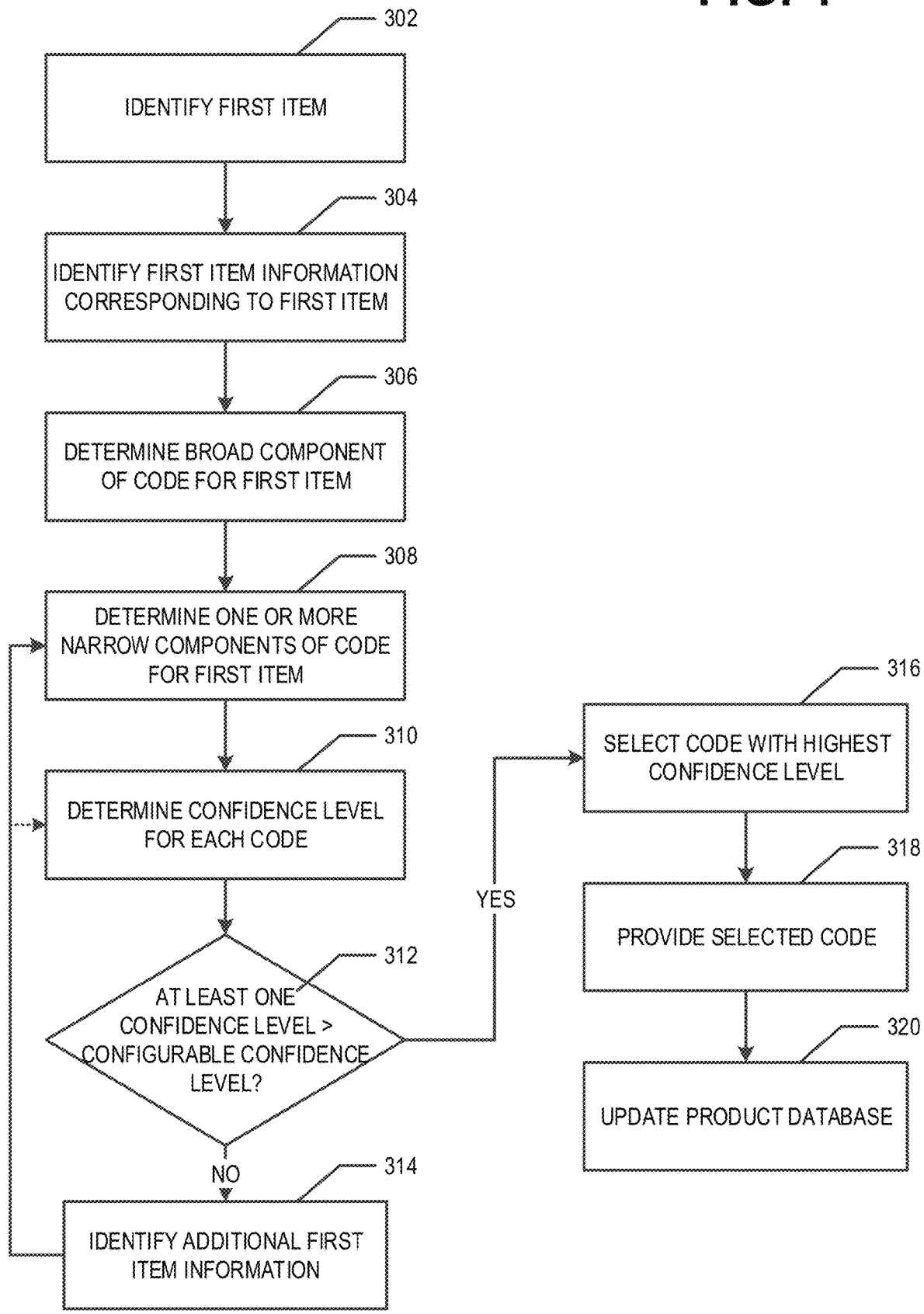

FIG. 4 provides a flowchart illustrating various processes and procedures for assigning a code to a first item. Starting at block 302, a first item is identified. For example, the carrier system 100 and/or the customer system 20 may identify a first item. For example, the first item may be an item that has not been previously classified, has not been reclassified within a configurable period of time, has had its description updated since the previous classification, and/or an item that is associated with an order to be shipped. In example embodiments, the first item may be identified based at least in part on a communication, as will be described in more detail elsewhere herein. In example embodiments, the communication may be an invoice or otherwise be related to an order received or made by the customer associated with the customer system 20. For example, the first item may be identified based on an item identifier and/or other item information/data lifted, read, extracted, and/or the like from communication.

In some embodiments, a first item is identified based on an item inventory database stored by the customer system 20. For example, the first item may be a new or updated item and the first item may be identified by determining that there is a new or updated item record in the item inventory database. For example, as discussed above, the item information/data collection application may identify a new or updated record in the item inventory stored by the customer system 20 and corresponding to a new or updated item. In other embodiments, the customer system 20 may store an item inventory via a method other than a database (e.g., as a collection of XML files, in a flat file, registry, and/or the like). Each record may comprise information/data about an item the customer sells, has in stock, uses in the manufacture of other items, and/or the like. The item inventory may comprise a record for each item the customer sells identified by part number and/or other item identifier. In example embodiments, an item identifier may be any code, symbol, unique identifier, alphanumeric identifier and/or the like used to identify the item within the customer's system. Such item identifiers may be represented as text, barcodes, tags, character strings, Aztec Codes, MaxiCodes, Data Matrices, Quick Response (QR) Codes, electronic representations, and/or the like. The item inventory may further comprise a record for at least one component used to manufacture an item. In an example embodiment, a new or updated first item may be identified by identifying a new or updated part number, a new or updated item identifier, a new or updated item record, a new or updated item description and/or the like. In another embodiment, the first item may be identified by crawling, systemically browsing, searching, querying, and/or the like an online or Internet accessible catalog provided by the customer system 20 for new or updated items (e.g., by the item information/data collection application). Various other approaches and techniques can be used to identify the first item.

At block 304, first item information corresponding to the first item is identified. For example, the carrier system 100 and/or the customer system 20 may identify first item information corresponding to the first item. In example embodiments, item information may comprise an item identifier and/or part number, entity information, an item description, item monetary value, a UPC for the item, and/or the like. In example embodiments, the entity information may comprise an entity identifier configured to identify a manufacturer, seller, purchaser, and/or shipper of the item and/or an industry identifier configured to identify an industry related with the entity. In example embodiments, the industry identifier for an entity may be accessed from an entity profile stored by and/or accessible to the carrier system 100, by the item information/data collection application, information/data lifted, read, extracted, and/or the like from a communication, and/or the like. For example, an entity may manufacture tables and be associated with the industry of furniture. In example embodiments, the item description may be a textual description (e.g., comprising words and numbers) of the first item. In example embodiments, the first item information may be identified from a communication (e.g., invoice or other order related communication), from a first item record of the item inventory stored by the customer system 20, from a response to an application programming interface (API) callout requesting first item information from the customer system 20, from an online or Internet accessible catalog entry for the first item, and/or the like. For example, the first item information may be identified based on item information/data provided to the carrier system 100 by the item information/data collection application (e.g., and stored in the item database 140).

At blocks 306 and 308, one or more possible codes for the first item are determined, identified, and/or the like. For example, the carrier system 100 and/or the customer system 20 may determine, identify, and/or the like one or more possible codes for the first item. In particular, the one or more possible codes for the first item may be based at least in part on a code schedule (e.g., stored as part of and/or in association with the rules database 145) and the first item information. In example embodiments, a code may comprise a broad component and a narrow component. For example, if the code is an HTS code, the broad component may be the chapter and the narrow component may be the heading and sub-heading, etc. for the HTS code. In another example embodiment, the broad component comprises the chapter and heading of the HTS code and the narrow component comprises the sub-heading and any sub-sub-headings for the HTS code. In some embodiments, the broad component of the one or more possible codes may be determined based at least in part on the entity information associated with the first item information and the narrow component of the one or more possible codes may be determined based at least in part on the item description associated with the first item information. In some embodiments, the one or more possible codes (the broad and narrow components thereof) are determined based at least in part on the item description associated with the first item information. In some example embodiments all of the one or more possible codes will have the same broad component and will only vary by the narrow component of the codes. In another embodiment, the one or more possible codes may not all have the same broad component.

At block 306, the broad component of the code is determined, identified, and/or the like. For example, the carrier system 100 and/or the customer system 20 may determine, identify, and/or the like the broad component of the code. In an example embodiment, the broad component of the code may be determined, identified, and/or the like based on the entity information of the first item information. For example, the broad component of the code may be determined based on the entity that manufactured and/or is shipping the first item, an industry associated with the entity that manufactured and/or is shipping the first item, and/or the like. For example, if the manufacturer and/or shipper is Tables'R'Us and/or the manufacturer and/or shipper is associated with the industry of furniture, the broad component of the code may be determined based thereon. For example, Chapter 94, which is generally directed to furniture, may be chosen as the broad component of the HTS code for a first item manufactured and/or shipped by Tables'R'Us.

At block 308, the narrow component of one or more possible codes are determined, identified, and/or the like. For example, the carrier system 100 and/or the customer system 20 may determine, identify, and/or the like the narrow components of one or more possible codes. In example embodiments, the narrow components of the one or more codes may be determined based on at least one word from the item description from the first item information. In example embodiments, item information/data captured/provided to the carrier system 100 by the item information/data collection application and/or item information/data lifted, read, extracted, and/or the like from the communication may be used to determine the narrow components of one or more codes. For example, the item description may provide a textual description of the item. The textual description and/or components thereof may be used to query the code schedule. For example, the textual description for the first item may be "dining table." If Chapter 94 of the HTS schedule is queried based on the description of "dining table" the HTS codes 9403.40.9040 and 9403.60.8040 may be identified as possible codes. Thus, one or more possible codes (and/or the narrow components thereof) may be determined and/or identified based on querying the code schedule based on the textual description of the first item.

At block 310, a confidence level for each of the one or more possible codes is determined. For example, the carrier system 100 and/or the customer system 20 may determine, compute, and/or the like a confidence level for each of the one or more possible codes for the first item. For example, the confidence level for a code may be based at least in part on the goodness of match between the textual description of the first item and the code description provided by the code schedule. In example embodiments, the confidence level for a code may be determined based at least in part one or more relevant second items identified within the item database 140.

In example embodiments, an item database may comprise second item information/data for a plurality of second items. A second item, as used herein, is an item that has already been classified and assigned a code. Some of the second items for which second item information/data is stored within the item database 140 have already been shipped/exported/imported/delivered by a carrier based at least in part on the code assigned thereto. FIG. 5 provides an example of a record corresponding to a second item in the item database 140 and comprising second item information/data. For example, a record corresponding to a second item may comprise an item identifier configured to identify the item. In some embodiments, the item identifier may be provided by the customer (e.g., by customer system 20). The record corresponding to the second item may further comprise an item description for the second item, a UPC for the second item, entity information for the second item, the code assigned to the second item, a sale price and/or monetary value of the second item, the date the code was assigned to the second item, and/or the like. If the second item has already been shipped/exported/imported/delivered (e.g., if the second item has been cleared through customs), the record for the second item may comprise a date the second item was cleared through customs and/or other dates related to the shipment/exportation/importation/delivery of the second item, and a success indicator for the assigned code, and/or the like. For example, the success indicator for the assigned code may indicate if the second item was held by customs, was audited by customs, was cleared through customs at an average, slower than average, or faster than average rate for similar items (e.g., items having similar descriptions, similar codes, the same code, and/or the like) being exported from the same country and/or port and/or imported to the same country and/or port as the second item and/or other customs information/data. For example, the success indicator for the assigned code may indicate the goodness of fit of the assigned code for the second item.

In example embodiments, a second item may be identified as relevant to a first item based on a comparison between characteristics of the first item and characteristics of the second item that may be identified in corresponding databases (e.g., the item database 140). In example embodiments, a second item is relevant to a first item if the second item is identified in the item database 140 based on a query using a query string determined, generated, and/or the like from the first item information/data (e.g., the textual item description, entity information, a possible code for the first item, and/or the like). For example, a second item may be relevant to a first item if the entity information for the first item and the entity information for the second item indicate that the first and second items were manufactured and/or shipped by the same entity and/or by entities in the same industry. In another example, a second item may be relevant to the first item if the first item and the second item are associated with the same UPC. In another example, a second item may be relevant to the first item if the item description of the second item comprises at least a threshold number of terms (e.g., gross number of words, percentage of total words in an item description, percentage of words having a minimum length (e.g., 5 characters), and/or the like) that match terms within the item description of the first item. For example, the item description in FIG. 5 includes the term "dining table." Thus, the second item corresponding to the record shown in FIG. 5 is relevant to the above example first item having an item description of "dining table." In another example, a second item may be relevant to the first item if the code assigned to the second item is one of the one or more possible codes being considered for the first item.

In example embodiments, the carrier system 100 may analyze item information/data corresponding to the first item (e.g., provided to the carrier system 100 by the item information/data collection application and/or lifted, read, extracted, and/or the like from the communication) and second item information/data stored in the item database 140 to identify second items that are relevant to the first item. For example, as noted before, the item information/data collection application may build, update, and/or the like the item database 140. When a code is assigned to a second item for which second item information/data is stored in the item database 140, an assigned code and corresponding information (e.g., confidence level, code type, and/or the like) may be added to a record in the item database 140 corresponding to the second item. When the second item is shipped internationally (e.g., when the second item is processed, cleared, held, audited, and/or the like through customs using the assigned code) the record in the item database 140 corresponding to the second item may be updated to comprise a shipped flag, a success indicator for the code, and/or the like. In example embodiments, only second items corresponding to records that comprise a shipped flag may be identified as relevant second items. In example embodiments, a portion of the first item information/data tagged as a description (e.g., lifted, read, or extracted from the communication and/or received through the item information/data collection application) may be analyzed to identify one or more query strings (e.g., keywords, key terms, key phrases, Boolean query strings, an item type, and/or the like). The item database 140 (e.g., comprising second item information/data provided by the item information/data collection application, lifted, read, and/or extracted from communications, and/or the like and comprising second items corresponding to a plurality of customers/entities) may then be queried using the one or more query strings to identify relevant second items.

In example embodiments, the confidence level for the one or more possible codes may be determined based on the second item information corresponding to one or more second items that are relevant to the first item. For example, if a relevant second item has the same UPC as the first item and the success indicator for the code assigned to the second item indicates that the assigned code is a good fit for the item, then the confidence level for the assigned code may be increased (if the code assigned to the second item is the same as one of the one or more possible codes). Similarly, if a second item having an item description, entity information, item identifier, and/or the like that is substantially similar to the item description, entity information, item identifier, and/or the like for the first item has a positive success indicator for the code assigned to the second item, the confidence level for the corresponding possible code may be increased. The amount by which the confidence level for the corresponding possible code is increased may be based at least in part on the degree of similarity between the second item information and the first item information. By the same token, if the second item information is similar to the first item information and the success indicator for the code assigned to the second item is negative, the confidence level for the corresponding possible may be decreased, possibly by an amount determined based on the degree of similarity between the second item information and the first item information.

Returning to FIG. 4, at block 312, it is determined if at least one of the confidence levels for the one or more possible codes is greater than a configurable confidence level. For example, an appropriate system (e.g., the carrier system 100, the customer system 20) may determine if the confidence level is greater than a configurable confidence level. For example, the confidence level may be compared to a predetermined configurable confidence level to determine if the confidence level is greater than the configurable confidence level. In various embodiments, the predetermined configurable confidence level may be based on the customer, the code, broad component of the code, or item type (e.g., the threshold level for items that consist of clothing may be greater than the threshold level for items that consist of automobile parts), and/or the like. In various embodiments, the configurable confidence level may be 99%, 95%, 90%, 80%, 75%, 70%, 50%, and/or the like.

If, at block 312, it is determined that none of the confidence levels for the one or more possible codes is greater than the configurable confidence level, the process continues to block 314. For example, the carrier system 100 and/or customer system 20 may, in response to determining that none of the confidence levels for the one or more possible codes is greater than the configurable confidence level, identify and/or determine additional first item information. For example, the carrier system 100 may request additional first item information from the customer system 20. For example, the additional first item information may be received in response to a request for additional first item information that is provided to the customer system 20 through an application programming interface (API). In another example, an application (e.g., the code module 132) resident on and/or having access to the client system 20 may crawl the client system 20 (e.g., an item inventory stored on the client system 20) to identify additional first item information stored in the memory of the client system 20. In another example, an application may crawl, query, and/or the like an online and/or Internet accessible catalog associated with the customer system 20. In another example, an appropriate system (e.g., the carrier system 100, the customer system 20) may cause information/data pertaining to the first item to be requested from a customer affiliate operating a customer computing device 25.

Figure 6:
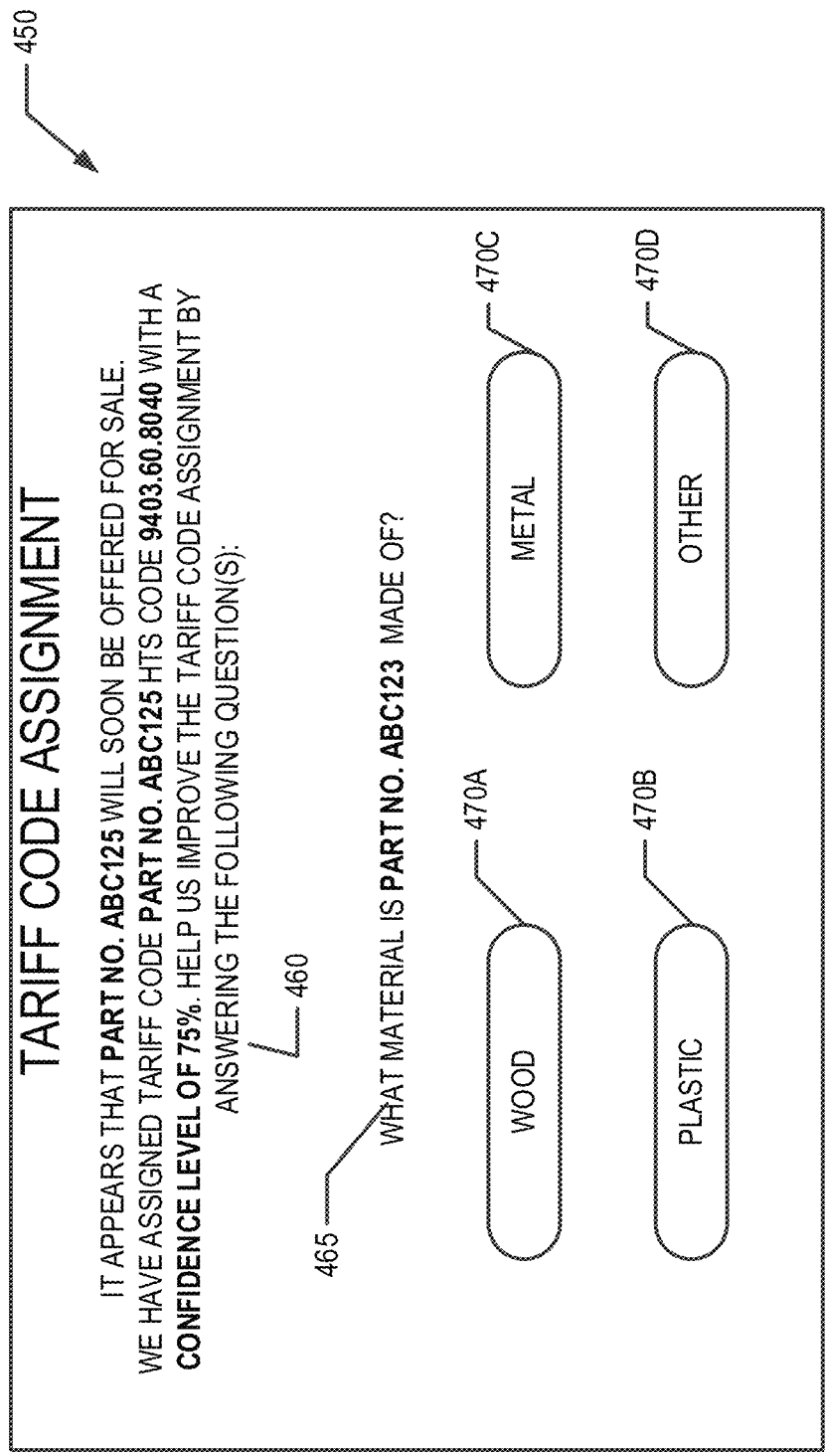

FIG. 6 provides an example view of an additional first item information request user interface 450 for requesting additional information/data pertaining to a first item that may be displayed to a customer affiliate via the customer computing device 25. In the illustrated example, the additional first item information request user interface 450 comprises at least a portion of the first item information/data 460, information/data request 465, and answer options 470a, b, c, d. For example, the portion of the first item information/data 460 may identify the first item (e.g., via the item identifier, part number, and/or the like), provide at least one of the one or more possible codes, the confidence level corresponding to the at least one provided possible code, and/or other information/data associated with the first item. The information/data request 465 may be a question or statement requesting further information/data pertaining to the first item that may be used to increase the confidence level of at least one of the one or more possible codes, aid in the identification of one or more additional possible codes (e.g., the additional possible code(s) may be of a deeper hierarchical level than at least one of the previous possible codes, and/or the like), and/or the like. The interface 450 may also provide the user with answer options 470a, b, c, d that the user (e.g., customer affiliate) may select to provide the requested information/data. In some embodiments, the interface 450 may provide an information/data field for the customer affiliate to type or otherwise provide input in response to the information/data request 465.

The process may then return to block 308 to identify one or more possible codes based on the additional first item information and/or to block 310 to re-evaluate the confidence levels for the one or more possible codes.

If, at block 312, it is determined that at least one of the confidence levels for the one or more possible codes is greater than the configurable confidence level, then the process continues to block 316. At block 316, the code of the one or more possible codes having the highest confidence level is selected. For example, the carrier system 100 and/or the customer system 20 may select the possible code of the one or more possible codes having the highest confidence level. The selected code may then be assigned to the first item. For example, the carrier system 100 and/or the customer system 20 may assign the selected code to the first item. In another example, the selected code may be provided to an affiliate of the carrier and/or the customer (e.g., through a display of a carrier computing device 10 and/or a customer computing device 25) for approval before the selected code is assigned to the first item.

Figure 7:
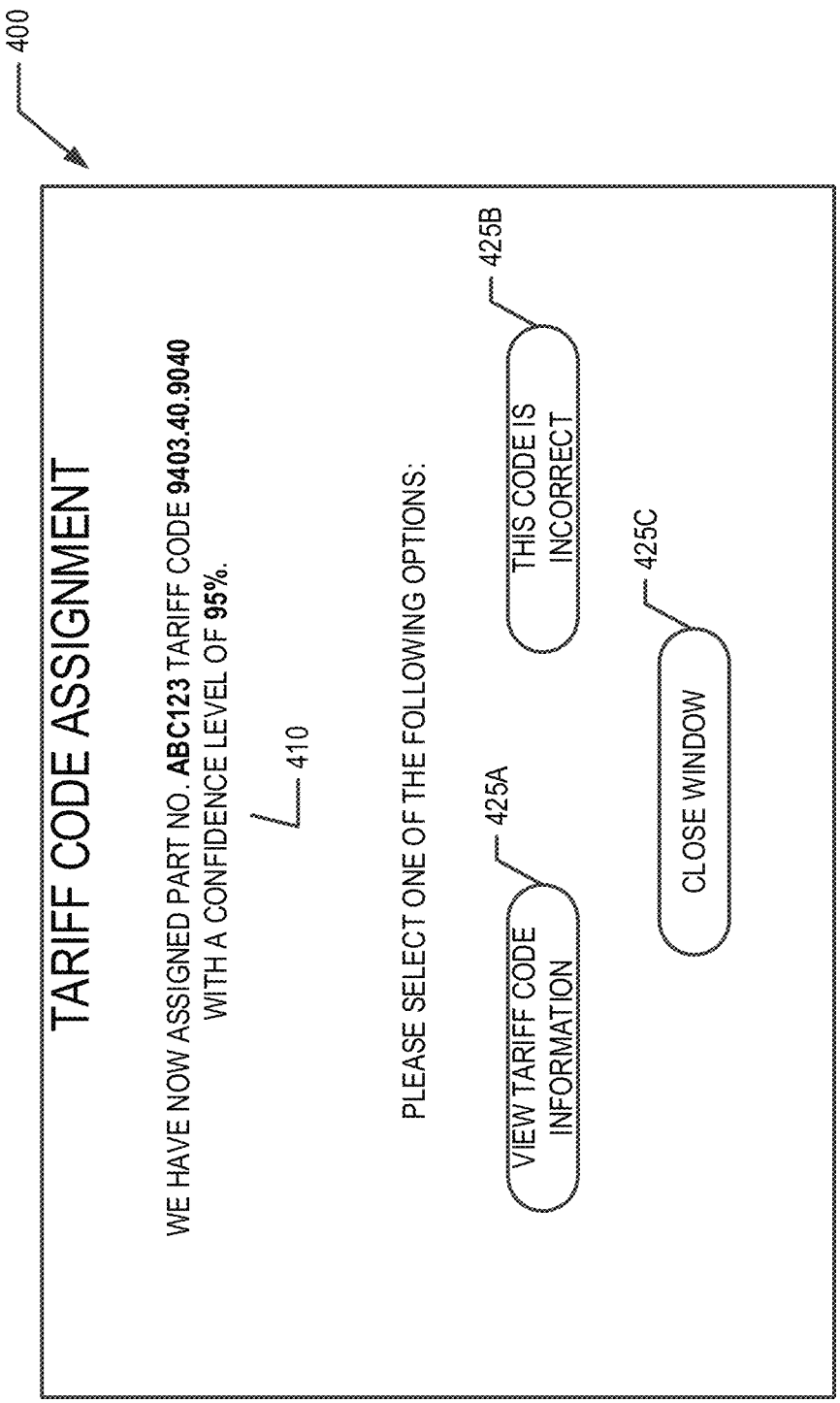

At block 318, the selected/assigned code may be provided. For example, the carrier system 100 and/or the customer system 20 may cause the carrier computing device 10 and/or the customer computing device 25 to display and/or otherwise provide the selected assigned code to an affiliate of the carrier and/or the customer. In an example embodiment, the carrier computing device 10 and/or the customer computing device 25 may provide an affiliate of the carrier and/or customer the opportunity to confirm and/or assign the selected/assigned code. For example, FIG. 7 illustrates an example view of code assignment/confirmation user interface 400. The user interface 400 provides code information/data 410 and options buttons 425a, 425b, 425c. For example, the code information/data 410 may include information/data that identifies the first item (e.g., an item identifier, part number, and/or the like), the selected/assigned code, the confidence level associated with the selected/assigned code, and/or the like. The options buttons may comprise a view code information/data button 425a, which, when selected, provides the user with more information/data pertaining to the selected/assigned code (e.g., a code description, classification information, and/or the like).

The options buttons may comprise an incorrect code button 425b such that the user (e.g., customer employee) may indicate the selected/assigned tariff code is incorrect. The options buttons may comprise a close window button 425c for closing the code assignment/confirmation user interface 400. In example embodiments, the code is assigned to the first item before the first item is shipped/exported/imported/delivered by a carrier. For example, the code may be assigned to the first item before the first item is tendered to a carrier for shipping/exporting/importing/delivering.

Returning to FIG. 4, at block 320 the item database 140 may be updated to include the first item, the first item information, and/or the code assigned to the first item. For example, the carrier system 100 may update the item database 140 to include the first item, the first item information, and/or the code the assigned to the first item. For example, a record for the first item may be created, generated, and/or the like within the item database 140 and/or the record corresponding to the first item in the item database 140 may be updated to include the assigned code. Thus, the item database 140 may comprise a record for each individual shipment of the first item and/or records that comprise information/data regarding one or more instances of individual shipments of the first item.

In various embodiments, a landed cost estimate for transporting the item to and/or from a particular country or various countries may be calculated/determined (e.g., using information from the rules database 145 described elsewhere herein), possibly in response to the determination of the code. For example, an appropriate system (e.g., the carrier system 100, the customer system 20) may calculate/determine a landed cost estimate for shipping the item to and/or from one or more countries. The landed cost estimate may be added to the record associated with the first item in the item database 140, displayed via the tariff code assignment user interface 400, and/or provided to the customer in some other manner.

2. Extracting Information from a Communication

In example embodiments, the carrier system 100 may be configured to lift, read, extract, and/or the like first item information from a communication. In example embodiments, the communication may be received from the customer system 20. In example embodiments, the communication may be an invoice or other communication relating to an order received or made by the customer and comprising at least the first item. For example, the communication may be an invoice provided in .pdf format or another computer readable file format. For example, the communication may comprise one or more form fields comprising entity information, a shipping from location/address, a deliver to location/address, an item identifier for one or more first items, an item description for each of one or more first items, a sale price or monetary value for each of the one or more first items, a UPC corresponding to a first item, and/or other invoice and/or order information/data. In example embodiments, the communication may comprise one or more metadata tags and/or the like identifying one or more form fields within the communication. In an example embodiment, the communication may comprise one or more form fields and the carrier system 100 may store and/or have access to a translator key for the communication. The translator key may be configured to provide the carrier system 100 with the information required to identify which form fields provide which information. For example, the communication may comprise metadata tags that tag form fields but do not provide the information necessary to identify which form field has the entity information, for example, entered therein.

The translator key may provide the information necessary for the carrier system 100 to determine which metadata tag corresponds to the form field providing the entity information, for example. In another example embodiment, the communication may not comprise metadata tags. In such embodiments, the translator key may provide data indicative of a location on and/or in the communication at which particular data is stored. For example, the translator key may indicate that a "shipping from" address is located within a 1" tall by 3" wide rectangle, wherein the top left corner of the rectangle is located 3" below a top edge of the communication and 1.5" right from a left edge of the communication (e.g., in pdf form). Accordingly, data (e.g., textual information) located within the rectangle may be determined to provide a shipping from address for the communication. In such embodiments, the translator key may identify the location of a plurality of data types on a particular communication, and accordingly may be utilized to obtain data for populating an item database entry corresponding to the communication. In another example embodiment, a customer affiliate (e.g., operating a customer computing device 25) may enter the invoice and/or order data into a fillable form and the filled fillable form may be received by the carrier system 100 as the communication.

Figure 8:
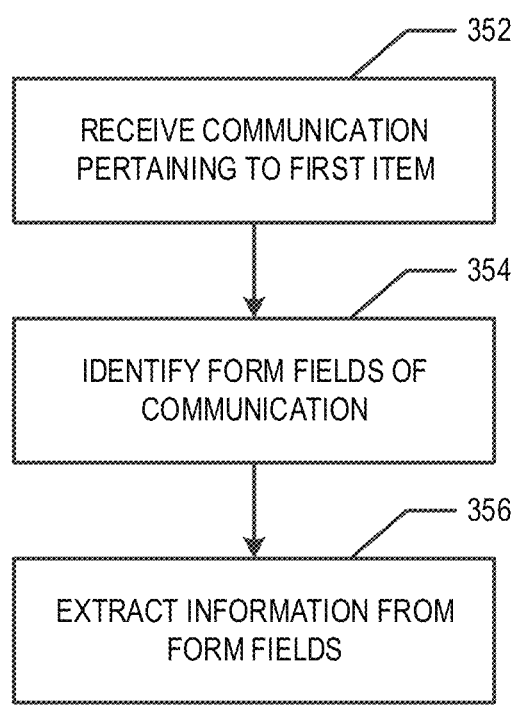

FIG. 8 provides a flowchart illustrating various processes and procedures that may be used to lift, read, and/or extract information (e.g., first item information and/or entity information related thereto) form a communication. Starting at block 352, a communication is received. For example, the carrier system 100 may receive a communication. In example embodiments, the communication is provided, transmitted, and/or the like by the customer system 20. In example embodiments, the communication is an invoice or other document comprising order information. In example embodiments, the communication may be a document in pdf format or another computer-readable file format. The communication may comprise an invoice and/or other document providing order information/data. For example, the communication may comprise one or more form fields comprising entity information, a shipping from location/address, a deliver to location/address, an item identifier for one or more first items, an item description for each of one or more first items, a sale price or monetary value for each of the one or more first items, a UPC corresponding to a first item, a quantity or amount of each of the one or more first items, and/or other invoice and/or order information/data. In an example embodiment, the communication may comprise an order identifier (e.g., number or other information) that may be used to identify billing information/data associated with the order.

At block 354, one or more form fields of the communication are identified. For example, the carrier system 100 identify one or more form fields of the communication. For example, an application operating on the carrier system 100 (e.g., communication module 134) may be configured to analyze one or more metadata tags embedded in the communication to identify one or more form fields therein. For example, the one or more metadata tags may provide information/data identifying one or more form fields of the communication and indicating what information/data is provided in the form field(s). In another example, the application may use a translator key to interpret one or more metadata tags embedded in the communication to identify one or more form fields of the communication and indicating what information/data is provided in the form field(s). In yet another example, the communication may not comprise any metadata tags and the translator key may be provide the information/data necessary to identify one or more form fields of the communication and identify the information provided thereby without the use of metadata tags. In still another example, the communication may be a filled fillable form and the form fields of the fillable form may be known to the carrier system 100 (e.g., the communication module 134) without the need for metadata tags or a translator key.

At block 356, information from at least one of the one or more form fields may be lifted, imported, read, extracted, and/or the like. For example, the carrier system 100 (e.g., the communication module 134) may lift, import, read, extract, and/or the like the information/data provided by at least one of the identified form fields of the communication. For example, an item identifier, first item information, entity information, and/or the like relating to the first item may be lifted, imported, read, extracted, and/or the like from the communication. In example embodiments, the receipt of the communication, and the lifting, importing, reading, extracting, and/or the like of an item identifier for the first item may trigger the dynamic classification of the first item. In example embodiments, the information/data lifted, imported, read, extract, and/or the like from the communication may be used to generate, create, or the like a new record in the item database 140 for each first item identified in the communication. In another example embodiment, the information lifted, imported, read, extracted, and/or the like from the communication may be held in a memory separate from the item database 140 until the first item(s) have been assigned a code, and/or the like.

In an embodiment, lifting, importing, reading, extracting, and/or the like the information from the communication may trigger a blacklist check based on the "ship to" or "sold to" information/data of the communication. For example, the process may further include a denied party screening step. For example, the name and/or address of the "ship to" and/or "sold to" party associated with the order may be identified and compared against a database of denied parties. A denied party may be a person or organization that the country of origin or destination country associated with the order has restricted the delivery of shipments and/or particular items to. For example, the carrier system 100 may access a denied parties database (e.g., stored in association with the carrier system, via the customs system 30 and/or another computing system) to determine if the "ship to" and/or "sold to" party associated with the order is among the listed denied parties. If the "ship to" and/or "sold to" party is a denied party, the customer may be notified (e.g., through any of various notification methods). If the "ship to" and/or "sold to" party is not a denied party, the processing of the order may continue.

As noted above, in various embodiments, the item information/data (e.g., the item description, item component description(s), country of origin of an item or item component, and/or the like) may be evaluated to identify potential license requirements for export or import of the first item. In some embodiments, this may be done as part of assigning a code to an item. For example, the carrier system 100 may extract order information/data relating to the first item(s) from the communication and evaluate the item information/data based on the order information/data (e.g., item(s) associated with the order, country of import, and/or the like) and/or information/data stored in the rule database 140 to identify potential license requirements, quota rules/restrictions, and/or the like for export or import of the first item(s) associated with a particular communication. In various embodiments, the customer may be notified of the identified potential license and/or quota requirements for export of import of the first item(s) associated with an order. For example, an item inventory record stored by the customer system 20 may be updated to indicate the identified potential license and/or quota requirements; an email, system notification, alert, and/or other notification may be provided by the carrier system 100 to the customer system 20 or one or more customer computing devices 25, and/or the like.

3. Customs Benchmarking

In various embodiments, the carrier system 100 may be configured to receive information/data from a customs system 30 or other system (e.g., a brokerage system). For example, customs system 30 may provide customs information/data to the carrier system 100 indicating that one or more items of one or more shipments have been cleared through customs, are being held by customs, being audited by customs, and/or the like. The received customs information/data may be stored in association with the shipping information/data for the corresponding item/shipment (e.g., the item indicated by the item/shipment shipping identifier included in the customs information/data and/or the like). In example embodiments, the customs information/data corresponding to an item may be stored as a part of the record corresponding to the item in the item database 140. In this manner, the carrier system 100 may have access to customs performance data associated with items, orders, and/or customers (e.g., stored in the item database 140).

In example embodiments, customs information/data corresponding to items shipped by the customer may be provided to the customer via a dashboard or other user interface (e.g., for display by a customer computing device 25). The customs information/data associated with items shipped by a customer may be provided to the customer via a user interface and/or via an application programming interface (API). Additionally, in some embodiments, the customs information/data associated with items shipped by a customer may be analyzed and the analysis may be provided to the customer via a user interface. Furthermore, in some embodiments, the customs information/data associated with items shipped by a customer may be analyzed based on the customs information/data associated with similar items shipped by other customers, and the analysis may be provided to the customer via a user interface. For example, the customs information/data may be analyzed to provide a bookmark or risk index to a customer and/or to analyze a customer's customs performance. The analysis may be broken down by country of origin, destination country, port of entry, code (e.g., tariff code, HTS code), and/or the like.

Thus, based on information/data provided from the brokerage repository of the customs system 30 to the carrier system 100, benchmarking relative to a customer's peers may be provided in terms of customs performance and key statistics. For example, a risk profile based on items shipped (e.g., commodity categories of items) and frequent holds, relative to the customer's peers, may be disclosed to the customer. For example, a dashboard or user interface illustrating customs performance across multiple metrics may be provided, informing a customer on their overall customs performance.

Figure 9:
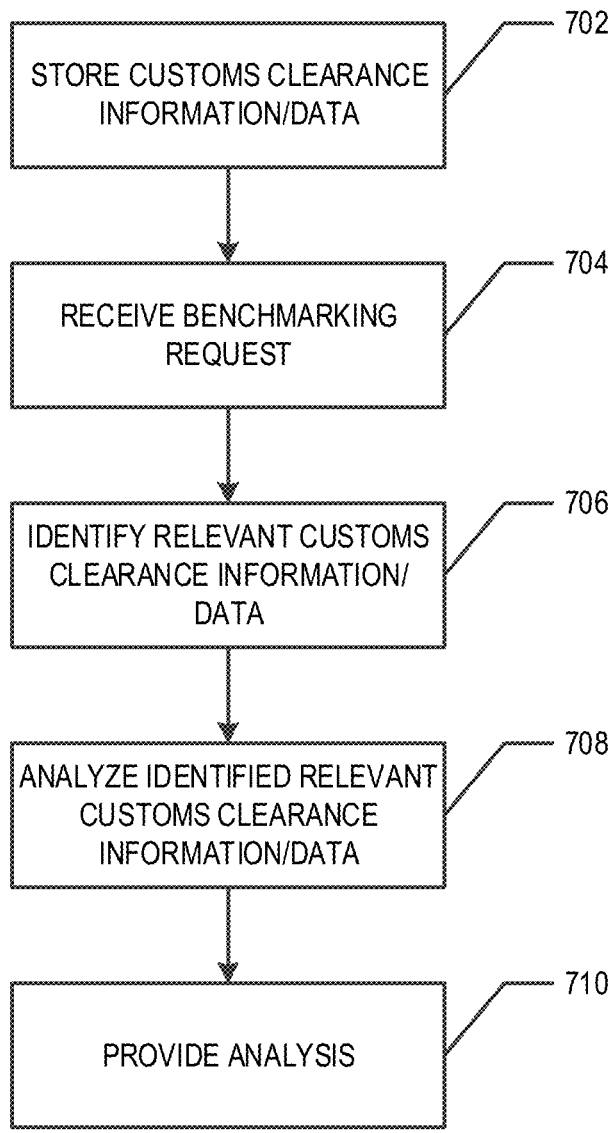

FIG. 9 is a flowchart illustrating some of the processes and procedures that may be completed in accordance with various embodiments of the present invention. Starting at block 702, customs information/data is received and stored. For example, the carrier system 100 may receive customs information/data provided by the customs system 30 and store the customs information/data (e.g., in the item database 140). The customs information/data for an item may be associated with a date and/or time (e.g., a timestamp), an item identifier, an item/shipment shipping identifier, an order identifier, an identifier of the shipper and/or receiver of the item (e.g., the name and/or address of the customer who shipped or who is receiving the item), and/or the like. The customs information/data may further indicate that the item has been cleared, is being held, is being audited, and/or the like along with other relevant information/data, such as the amount of time an item was held, the dates an item was held, the time for carrying out an audit, and/or the like. In some embodiments, the customs information/data may comprise notes from one or more customs agents. For example, the customs information/data may indicate that the item description and/or the code listed on the Declaration for the item was incorrect, incomplete, and/or the like; that the calculated fees for the item were incorrect; that the importation of the item from the origin country is not allowed by the customs rules and regulations of the country of import, and/or the like. For example, the customs information/data may provide information/data used to determine the goodness of fit of the assigned code to the item. For example, the customs information/data may provide information/data used to determine the level of success for having the item be efficiently processed by customs using the assigned code. For example, the success indicator for the assigned code may be determined based at least in part on the customs information/data. In various embodiments the customs information/data is stored in association with shipping information/data for the item and/or in association with the item/shipment shipping identifier (e.g., in item database 140, and/or the like). In some embodiments, at least a portion of the customs information/data may be stored in association with a customer profile for the customer shipping and/or receiving the item.

At block 704, a benchmarking request is received. For example, the carrier system 100 may receive a benchmarking request. For example, a customer affiliate (e.g., operating a customer computing device 25) may log on (e.g., provide input comprising a username/customer identifier and password via a user interface displayed on the customer computing device 25) to a user interface provided by the carrier system 100 and associated with a customer profile associated with the customer. In various embodiments, the benchmarking request may be received after the customer affiliate logs on to the user interface, in response thereto, in response to the customer affiliate selecting a benchmark button provided via the user interface, and/or the like. In another embodiment, a customer affiliate may select a link in an email and the benchmarking request may be received in response thereto. In another embodiment, the carrier system 100 may regularly, periodically, and/or the like perform a benchmarking analysis (e.g., the benchmarking request may be automatically triggered by a calendar date, day of the week, length of time since the analysis was last performed, and/or time). For example, the carrier system 100 may automatically perform benchmarking analysis for the customer at 2:00 am every Wednesday or at 3:00 pm on the first day of every month, and/or the like. In various embodiments, the benchmarking request may identify an importing country, importing port, country of origin, code, item type (e.g., type of commodity or good, packaging type, and/or the like). For example, the customer affiliate may fill out a form via a user interface (e.g., displayed via the customer computing device 25) requesting information/data pertaining to a particular importing country and a particular tariff code. In other embodiments, the information/data identifying an importing country and code (e.g., tariff code, HTS code), for example, may be stored in association with the customer profile associated with the customer).

At block 706, the customs information/data relevant to the benchmarking request is identified. For example, the carrier system 100 may identify the relevant customs information/data. For example, the benchmarking module 136 operating on the carrier system 100 may identify the relevant customs information/data. For example, if the benchmarking request comprises a particular importing country and a particular code, the carrier system 100 may identify customs information/data associated with the particular importing country and the particular code. For example, the item database 140 may be queried to identify items matching the particular criteria of the benchmarking request. In various embodiments, the identified customs information/data may be divided into two groups: information/data associated with the customer (e.g., customer customs information/data) and information/data not associated with the customer (e.g., competitor customs information/data). In some embodiments, the competitor customs information/data may be filtered to only include information/data associated with companies, organizations, and/or the like that are similar to the customer in size, scope, markets, market presence, volume of items shipped, and/or the like. In some embodiments, a combined data set ("industry information/data") including the customer information/data and the competitor information/data may be used to analyze the customer's customs performance.

At block 708, the relevant customs information/data is analyzed. For example, a statistical analysis of the relevant customs information/data is conducted. For instance, the carrier system 100 may analyze the relevant customs information/data. For example, the benchmarking module 136 operating on the carrier system 100 may analyze the relevant customs information/data. In various embodiments, the customer customs clearance information/data may be analyzed independently, in light of and/or in comparison to the industry/competitor customs information/data, and/or a combination thereof. For example, an average clearance time, total number of holds, and/or the like may be determined/computed for a variety of time periods (e.g., the past week, the past two weeks, the past month, the past quarter, the past year, the past three years, and/or the like). In some embodiments, the industry/competitor customs information/data is based on the customs information/data for other customers of the carrier and in a similar industry and/or that ship/receive similar items as the customer for whom the analysis is being conducted. For example, a carrier may provide shipping services to ten companies that ship items that fall under HTS code 2693. When a benchmarking request associated with one of those ten companies is received, the customs information/data for at least some of those ten companies may be combined to provide industry/competitor customs information/data.

In various embodiments, the analysis may also compare the results for the customer customs information/data to the industry/competitor customs information/data. For example, the average clearance time may be calculated for the customer customs information/data and the industry/competitor customs information/data. It may then be determined if the average customer clearance time is greater, approximately the same as, or less than the average industry/competitor customs clearance time. In some embodiments, the determination of whether the average customer clearance time is greater than, approximately the same as, or less than the average industry/competitor or combined customs clearance time is based on the z-score of the average customer clearance time. For example, if the average customer clearance time is within half a standard deviation, one standard deviation, or two standard deviations of the average industry/competitor clearance time, than the average customer clearance time may be considered average. In another example, if the average customer clearance time is more than half a standard deviation, one standard deviation, or two standard deviations from the average industry/competitor clearance time, than the average customer clearance time may be considered above/below average, as appropriate.

At block 710, the analysis of the relevant customs information/data and/or analysis is provided. For example, the carrier system 100 may provide the analysis to the carrier computing device 10, the customer system 20, the customer computing device 25, and/or the like. In various embodiments, the carrier system 100 may provide the analysis to the customer computing device 25 for display via a user interface. For example, the benchmarking module 136 operating on the carrier system 100 may provide the analysis. An example analysis user interface 500 is shown in FIG. 10. The illustrated analysis user interface 500 comprises analysis identifying information/data 505, analysis 510, and options buttons (e.g., 515*a*, 515*b*). In example embodiments, information/data relevant to quotas relevant to the items shipped and/or received by the customer, the code being analyzed, and/or the like may be tracked and reported.

The identifying information/data 505 may identify any filters used in preparing the analysis. For example, the illustrated analysis is for the customer XYZ Corp. and is for customs information/data related items assigned code 2693. The illustrated analysis is not necessarily particular to a specific importing country or port, however, the analysis user interface 500 provides links 507*a*, 507*b* that the customer affiliate may use to request an analysis for the indicated customer and code for a particular importing country and/or port.

The illustrated analysis 510 includes the average number of days for clearance for items associated with code 2693 shipped by the XYZ Corp., the average number of days for clearance for item shipped by other companies, organizations, and/or the like (e.g., the XYZ Corp.'s peers) associated with the code 2693 and an indication of how the XYZ Corp.'s customs performance compares to that of the XYZ Corp.'s peers (e.g., based on the industry/competitor customs information/data). In the illustrated embodiment, the analysis 510 is provided in tabular format. In other embodiments, the analysis may be provided in graphical format, in paragraph format, and/or the like. The analysis 510 also includes a similar table for the number of customs holds for the XYZ Corp., the number of customs holds for the XYZ Corp.'s peers, and a comparison of the number of customs holds for the XYZ Corp to the number of customs holds for the XYZ Corp.'s peers. The illustrated embodiment provides the analysis for three time frames, the past 30 days, the past three months, and the past year. In this example, this allows the employee of the XYZ Corp. to see that the customs performance of the XYZ Corp. has improved over the past year relative to both the customs performance of the XYZ Corp. and compared to the XYZ Corp.'s peers.

The analysis user interface 500 further comprises options buttons 515*a*, 515*b*. The user may select the how to improve options button 515*a* to receive tips or insight into how to improve the customer's customs performance. In some embodiments, the tips and/or insight may be generic information/data regarding how to improve customs performance. In some embodiments, the tips and/or insight may be provided based on an automated and/or human analysis of the notes associated with the customs information/data for the customer. In some embodiments, the customer affiliate may be provided with an offer for an audit of the customer's international shipping practices and/or assistance/guidance in the formulation of a plan/strategy for improving the customer's customs performance. The customer affiliate (e.g., operating the customer computing device 25) may select the select another code option button 515b to select another code and view analysis of customs information/data associated with a selected code.

4. Common Customs Rules Repository

In various embodiments, customs rules and regulations information/data (referred to as "tariff data" herein) for a plurality of countries may be stored in a rules database 145 and/or other information/data storage method. For example, the rules database 145 may be common customs rules repository that may be queried for access to a wide variety of tariff information/data. The tariff information/data for each country may be broken down by code and/or may include information/data required for calculating fees (e.g., duty, taxes, and/or the like), information/data related to quotas, and/or the like. An employee of the carrier or affiliate of a customer may request and be provided with tariff information/data (e.g., via the user interface module 130) from the common customs rules repository via a user interface (e.g., displayed via the carrier computing device 10 or the customer computing device 25). For example, a global repository of customs rules and regulations information/data may be indexed, stored, and/or shared. In another example, a global code directory (e.g., a global HTS code directory) may provide cross checking and global search capabilities.

FIG. 11 provides a flowchart illustrating some processes and procedures that may be completed in accordance with various embodiments of the invention. Starting at block 902, tariff information/data is received. For example, the carrier system 100 may receive tariff information/data. In various embodiments, the tariff information/data is associated with a country and/or port. Additionally, the tariff information/data may be associated with a code, commodity type, and/or the like. In various embodiments, the carrier system 100 may receive updated tariff information/data regularly, periodically, whenever a change is made to the tariff data, and/or the like. The received tariff information/data is stored, for example, in a database (e.g., rules database 145). In example embodiments, the tariff information/data is provided by a customs system 30, and/or the like.

Figure 12:
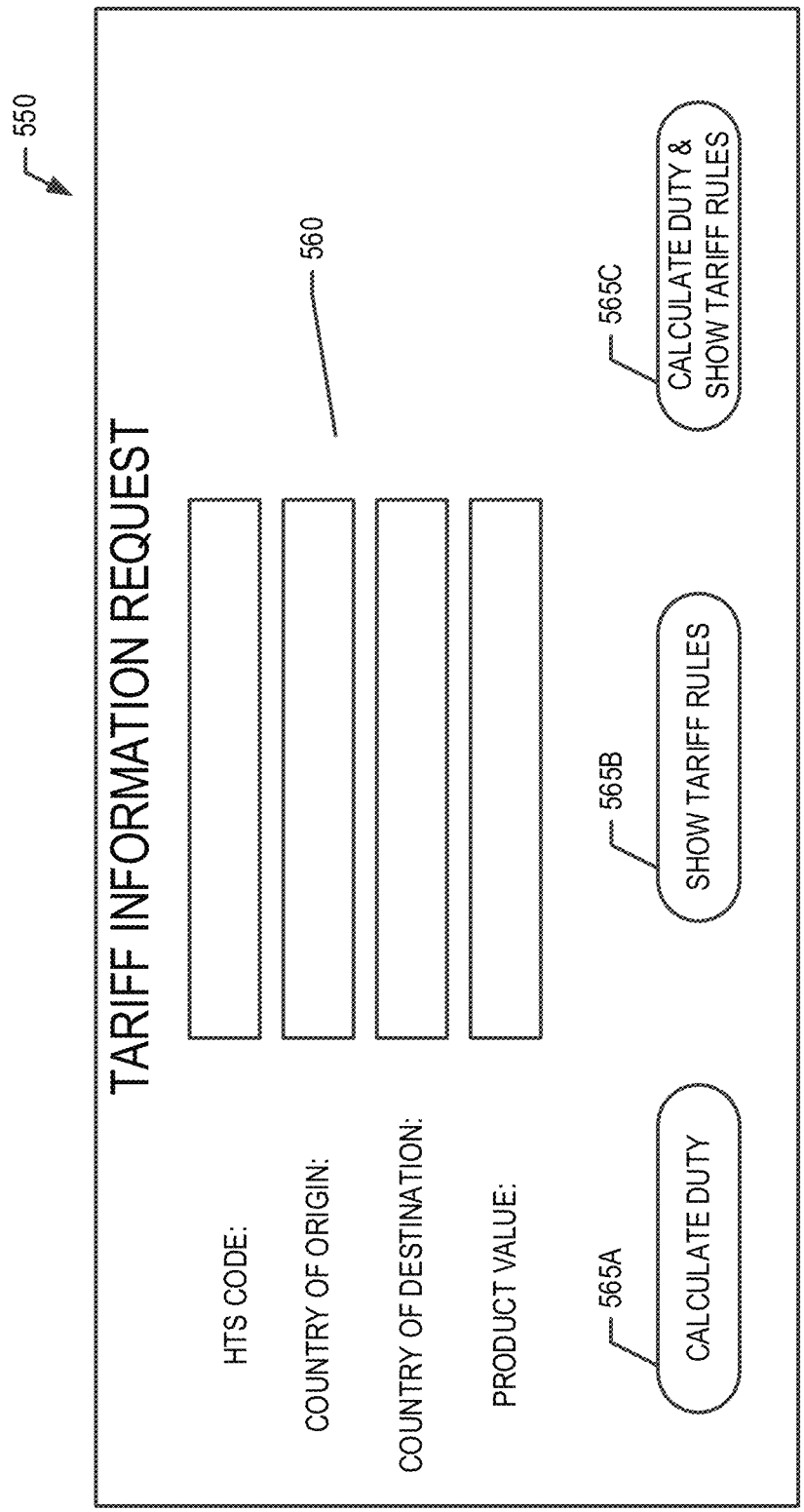

At block 904, a tariff information/data request is received. For example, the carrier system 100 may receive a tariff information/data request. For example, an employee of the carrier (e.g., operating a carrier computing device 10) or a customer affiliate (e.g., operating a customer computing device 25) may request tariff information/data by providing information/data via a user interface. FIG. 12 illustrates an example tariff information/data request user interface 550. The tariff information/data request user interface 550 may comprise information/data request fields 560 and options buttons 565a, b, c. The information/data request fields 560 may allow an employee of the carrier (e.g., operating a carrier computing device 10) or a customer affiliate (e.g., operating a customer computing device 25) to enter/provide (e.g., via a keyboard or other input device) a code (e.g., a tariff code, HTS code), importing country, country of origin, item value, commodity type, item description, shipping costs, and/or other information/data that may be relevant to determining the relevant customs rules and regulations information/data, relevant quota information/data, and/or calculating fees for the item (e.g., duty, tax, and/or the like).

In some embodiments, a pull down list may be provided for the employee of the carrier or customer to select a destination country, country of origin, code, and/or the like. In some such embodiments, the options provided via the drop down list may be modified, ordered, and/or the like based on the customer and the customer's shipping history. For example, if the customer most commonly imports items to Spain, Spain may be listed as the first option for destination country. After providing and/or selecting the information/data for the tariff request, the employee of the carrier (e.g., operating a carrier computing device 10) or the customer affiliate (e.g., operating a customer computing device 25) may then select one of the options buttons (e.g., 565a, b, c). For example, the carrier employee of customer affiliate may select the calculate fees option button 565a to request a calculation of the fees for the item described in the information/data request fields 560. In another example, the employee of the carrier or customer may select the show tariff rules option button 565b to request the tariff rules applying to the item described in the information/data request fields 560 be displayed and/or otherwise provided. In yet another example, the employee of the carrier or customer may select the calculate fees and show tariff rules option button 565c to request the fees be calculated for and the tariff rules applying to the item described in the information/data request fields 560 be provided.

Returning to FIG. 11, at block 906, the relevant tariff information/data is identified. For example, the information/data provided and/or selected in the information/data request fields 560 may be used to identify the relevant tariff information/data. For example, the carrier system 100 may identify the relevant tariff information/data in the rules database 145. For example, the tariff information/data corresponding to the provided country of origin, importing/destination country, code, and/or the like may be identified as relevant tariff information/data. In various embodiments, for example, if a fee calculation has been requested, the fees corresponding to the provided/selected information/data in the information/data request fields 560 is calculated based on the identified tariff information/data. In another example, year-to-date quota information/data for the customer may be identified along with the relevant quota rules and regulations. At block 908, the relevant tariff information/data and fee calculation, if calculated, is provided. For example, the carrier system may provide the relevant tariff information/data and fee calculation, if calculated. Quota information/data, if relevant, may also be provided. For example, the carrier computing device 10 or the customer computing device 25 may display the provided relevant tariff information/data and fee calculation via a user interface.

V. CONCLUSION

Many modifications and other embodiments of the invention set forth herein will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation. Additional information is included in the attached Appendix.

That which is claimed:

1. A method comprising:
receiving, by one or more processors and through a communications interface, a communication comprising a plurality of form fields;
identifying, by the one or more processors, at least one form field corresponding to first item information for a first item based at least in part on at least one of (a) metadata corresponding to the at least one form field or (b) a translator key corresponding to the communication;
extracting, by the one or more processors, at least a textual item description for the first item from the at least one form field;
accessing, by the one or more processors, a code schedule stored in a memory accessible to the one or more processors;
determining, by the one or more processors, one or more codes for the first item based on the textual item description and the code schedule;
determining, by the one or more processors, one or more second items that are relevant to the first item, wherein determining comprises:
identifying at least a portion of the textual item description for the first item extracted from the at least one form field to be used as a query string;
querying an item database stored in the memory accessible to the one or more processors using the query string identified, wherein the item database comprises (a) an item description, (b) an assigned code, and (c) a success indicator for the assigned code for each of a plurality of items and wherein the plurality of items comprises the one or more second items; and
responsive to querying the item database, determining one or more second items are relevant to the first item when the query string identified from the textual item description for the first item extracted from the at least one form field (i) returns at least one of the assigned code or the success indicator for the assigned code for the one or more second items and (ii) matches at least a threshold number of terms in the item description for the one or more second items;
determining, by the one or more processors, a confidence level for each of the one or more codes for the first item based at least in part on (a) the textual item description for the first item and (b) the item description, assigned code, and the success indicator for the assigned code for the one or more second items determined to be relevant to the first item;
determining, by the one or more processors, that at least one confidence level corresponding to the one or more codes for the first item is greater than a configurable confidence level;
selecting, by the one or more processors, a first code from the one or more codes when a first confidence level corresponding to the first code is larger than a second confidence level corresponding to a second code of the one or more codes and when the first confidence level is greater than the configurable confidence level;
updating, by the one or more processors, the item database to comprise at least a portion of the first item information and the first code selected based on the first confidence level being larger than the second confidence level and the configurable confidence level; and prior to tender of the first item to a carrier for shipping, providing the updated item database to the first entity.

2. The method of claim 1, wherein (a) the first item information is associated with first entity information corresponding to at least one of a manufacturer or the shipper of the first item and (b) the first code comprises at least a broad component and a narrow component, and the method further comprises identifying the broad component based at least in part on the first entity information.

3. The method of claim 1, wherein determining the confidence level for each of the one or more codes for the first item comprises:
comparing the first item information to the item description for each of the one or more second items to determine a relevance score;
determining the confidence level for each of the one or more codes based at least in part on (a) the relevance score, (b) the assigned code, and (c) an indication of goodness of fit of the assigned code for each of the one or more second items.

4. The method of claim 3, further comprising:
identifying additional first item information corresponding to the first item, wherein identifying the additional first item information comprises at least one of:
(a) receiving the additional first item information in response to a request for the additional first item information, the request provided through an application programming interface;
(b) crawling a client system to identify additional first item information stored in the memory of the client system; or
(c) accessing the first information through an Internet accessible information source.

5. The method of claim 4, wherein the additional first item information is identified in response to determining that the confidence levels for the one or more codes for the first item are less than a confidence level threshold and the method further comprises:
re-evaluating the confidence levels for the one or more codes for the first item based at least in part on the additional first item information.

6. The method of claim 1, wherein the code schedule is stored in association with a database of rules and regulations relating to each of a plurality of codes.

7. The method of claim 1, wherein the success indicator for the assigned code for one of the one or more second items is based at least in part on an outcome of a transaction corresponding to the one of the one or more second items in which the assigned code was used to classify the one of the one or more second items.

8. The method of claim 7, wherein the success indicator for the assigned code for the one of the one or more second items is based at least in part on a comparison of (a) the outcome of the transaction corresponding to the one of the one or more second items in which the assigned code was used to classify the one of the one or more second items to (b) an average outcome of a plurality of transactions corresponding to items that are (i) relevant to the one of the one or more second items, (ii) assigned a same code as the one of the one or more second items, (iii) associated with entity information that identifies at least one of the same manufacturer or shipper as second entity information associated with the one of the one or more second items, (iv) associated with entity information that identifies a same industry as the second entity information associated with the one of the one or more second items, or (v) a combination thereof.

9. The method of claim 1, wherein the first item information comprises a first Universal Product Code (UPC) and the item information for at least one of the one or more second items comprises a second UPC, and wherein determining the one or more second items are relevant to the first item is based on a comparison of the first UPC and the second UPC.

10. The method of claim 1, further comprising determining that one of the one or more second items is relevant to the first item based at least in part on a comparison of the textual item description for the first item and the item description corresponding to the one of the one or more second items.

11. The method of claim 1, wherein (a) the first item information is associated with first entity information corresponding to at least one of a manufacturer or shipper of the first item, (b) item information corresponding to at least one of the one or more second items is associated with second entity information, and (c) determining that the one or more second items are relevant to the first item comprises comparing the first entity information and the second entity information.

12. The method of claim 11, wherein the one or more second items are relevant to the first item when at least one of (a) a first entity identified by the first entity information is the same as a second entity identified by the second entity information or (b) a first industry identified by the first entity information is the same as a second industry identified by the second entity information.

13. An apparatus comprising at least one processor and at least one memory storing computer program code, the at least one memory and the computer program code configured to, with the processor, cause the apparatus to at least:
receive a communication comprising a plurality of form fields;
identify, in the communication, at least one form field corresponding to first item information for a first item based at least in part on at least one of (a) metadata corresponding to the at least one form field or (b) a translator key corresponding to the communication;
extract, from the communication, at least a textual item description for the first item from the at least one form field corresponding to the first item information for the first item;
access a code schedule stored in at least one memory accessible to the one or more processors;
determine one or more codes for the first item based on the textual item description extracted from the communication and the code schedule stored in the at least one memory;
determine one or more second items are relevant to the first item by:
identifying at least a portion of the textual item description for the first item extracted from the at least one form field to be used as a query string;
querying an item database stored in the at least one memory accessible to the one or more processors using the query string, wherein the item database comprises (a) an item description, (b) an assigned code, and (c) a success indicator for the assigned code for each of a plurality of items and wherein the plurality of items comprises the one or more second items; and
responsive to the query of the item database, determining one or more second items are relevant to the first item when the query string identified from the textual item description for the first item extracted from the at least one form field (i) returns at least one of the assigned code or the success indicator for the assigned code for the one or more second items and (ii) matches at least a threshold number of terms in the item description for the one or more second items;
determine a confidence level for each of the one or more codes for the first item based at least in part on (a) the textual item description for the first item and (b) the item description, assigned code, and the success indicator for the assigned code for the one or more second items determined to be relevant to the first item;
determine that at least one confidence level corresponding to the one or more codes for the first item is greater than a configurable confidence level;
select a first code from the one or more codes for the first item when a first confidence level corresponding to the first code is larger than a second confidence level corresponding to a second code of the one or more codes and when the first confidence level is greater than the configurable confidence level;
update the item database to comprise at least a portion of the first item information and the first code selected based on the first confidence level being larger than the second confidence level and the configurable confidence level; and
prior to tender of the first item to a carrier for shipping, providing the updated item database to the first entity.

14. The apparatus of claim 13, wherein (a) the first item information is associated with first entity information corresponding to at least one of a manufacturer or shipper of the first item, and (b) the first code comprises at least a broad component and a narrow component, and wherein the broad component is identified based at least in part on the first entity information.

15. The apparatus of claim 13, wherein to determine the at least one confidence level corresponding to the one or more codes, the at least one memory and the computer program code configured to, with the processor, cause the apparatus to at least:
compare the first item information to the item description for each of the one or more second items to determine a relevance score;
determine the at least one confidence level corresponding to the one or more codes for the first item based at least in part on (a) the relevance score, (b) the assigned code, and (c) an indication of goodness of fit of the assigned code for each of the one or more second items.

16. The apparatus of claim 13, wherein the at least one memory and the computer program code are further configured to, with the processor, cause the apparatus to at least:
identify additional first item information corresponding to the first item, wherein identifying the additional first item information comprises at least one of:
receiving the additional first item information in response to a request for the additional first item information, the request provided through an application programming interface;
based on the additional first item information:
determining that the at least one confidence level corresponding to the one or more codes for the first item is greater than a configurable confidence level;
selecting the first code from the one or more codes for the first item when the first confidence level corresponding to the first code is larger than the second confidence level corresponding to the second code of the one or more codes and when the first confidence level is greater than the configurable confidence level; and updating the item database to comprise at least a portion of the first item information and the first code.

17. The apparatus of claim 16, wherein the additional first item information is identified in response to determining that the at least one confidence level corresponding to the one or more codes for the first item is greater than a confidence level threshold, and wherein the at least one memory and the computer program code are further configured to, with the processor, cause the apparatus to at least:

re-evaluate the at least one confidence level corresponding to the one or more codes for the first item based at least in part on the additional first item information.

18. The apparatus of claim 13, wherein the code schedule is stored in association with a database of rules and regulations relating to each of a plurality of codes.

19. The apparatus of claim 13, wherein the success indicator for the assigned code for one of the one or more second items is based at least in part on an outcome of a transaction corresponding to the one of the one or more second items in which the assigned code was used to classify the one of the one or more second items.

20. The apparatus of claim 19, wherein the success indicator for the assigned code for the one of the one or more second items is based at least in part on a comparison of (a) the outcome of the transaction corresponding to the one of the one or more second items in which the assigned code was used to classify the one of the one or more second items to (b) an average outcome of a plurality of transactions corresponding to items that are (i) relevant to the one of the one or more second items, (ii) assigned a same code as the one of the one or more second items, (iii) associated with entity information that identifies at least one of the same manufacturer or shipper as second entity information associated with the one of the one or more second items, (iv) associated with entity information that identifies a same industry as the second entity information associated with the one of the one or more second items, or (v) a combination thereof.

21. The apparatus of claim 13, wherein the first item information comprises a first Universal Product Code (UPC) and the item information for at least one of the one or more second items comprises a second UPC, and wherein the one or more second items are identified as relevant to the first item based on a comparison of the first UPC and the second UPC.

22. The apparatus of claim 13, wherein the at least one memory and the computer program code are further configured to, with the processor, cause the apparatus to at least determine that one of the one or more second items is relevant to the first item based at least in part on a comparison of the textual item description for the first item and the item description corresponding to the one of the one or more second items.

23. The apparatus of claim 13, wherein (a) the first item information is associated with first entity information corresponding to at least one of a manufacturer or shipper of the first item, (b) the item information corresponding to at least one of the one or more second items is associated with second entity information, and (c) determining that the one or more second items are relevant to the first item comprises comparing the first entity information and the second entity information.

24. The apparatus of claim 23, wherein the one or more second items are relevant to the first item when at least one of (a) a first entity identified by the first entity information is the same as a second entity identified by the second entity information or (b) a first industry identified by the first entity information is the same as a second industry identified by the second entity information.

25. A computer program product comprising at least one non-transitory computer-readable storage medium having computer-executable program code instructions stored therein, the computer-executable program code instructions comprising program code instructions configured to:

receive a communication comprising a plurality of form fields;

identify, in the communication, at least one form field corresponding to first item information for a first item based at least in part on at least one of (a) metadata corresponding to the at least one form field or (b) a translator key corresponding to the communication;

extract at least a textual item description for the first item from the at least one form field identified in the communication;

access a code schedule stored in a memory accessible to the one or more processors;

determine one or more codes for the first item based on the extracted textual item description and the code schedule;

determine one or more second items are relevant to the first item by:
identifying at least a portion of the textual item description for the first item extracted from the at least one form field to be used as a query string;
querying an item database stored in the memory accessible to the one or more processors using the query string, wherein the item database comprises (a) an item description, (b) an assigned code, and (c) a success indicator for the assigned code for each of a plurality of items and wherein the plurality of items comprises the one or more second items; and
responsive to the query of the item database, determining one or more second items are relevant to the first item when the query string identified from the textual item description for the first item extracted from the at least one form field (i) returns at least one of the assigned code or the success indicator for the assigned code for the one or more second items and (ii) matches at least a threshold number of terms in the item description for the one or more second items;

determine a confidence level for each of the one or more codes for the first item based at least in part on (a) the textual item description for the first item and (b) the item description, assigned code, and the success indicator for the assigned code for the one or more second items determined to be relevant to the first item;

determine that at least one confidence level corresponding to the one or more codes for the first item is greater than a configurable confidence level;

select a first code from the one or more codes for the item when a first confidence level corresponding to the first code is larger than a second confidence level corresponding to a second code of the one or more codes and when the first code is greater than the configurable confidence level;

update the item database to comprise at least a portion of the first item information and the first code; and prior to tender of the first item to a carrier for shipping, providing the updated item database to the first entity.

* * * * *